(12) United States Patent
Melis et al.

(10) Patent No.: US 8,437,712 B2
(45) Date of Patent: May 7, 2013

(54) METHOD AND SYSTEM FOR MULTIPLE ANTENNA COMMUNICATIONS USING MULTIPLE TRANSMISSION MODES, RELATED APPARATUS AND COMPUTER PROGRAM PRODUCT

(75) Inventors: Bruno Melis, Turin (IT); Alfredo Ruscitto, Turin (IT); Paolo Semenzato, Rome (IT); Renata Mele, Milan (IT); Giuseppe Grassano, Milan (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 923 days.

(21) Appl. No.: 12/084,134

(22) PCT Filed: Oct. 27, 2005

(86) PCT No.: PCT/EP2005/011529
§ 371 (c)(1),
(2), (4) Date: Aug. 27, 2009

(87) PCT Pub. No.: WO2007/048427
PCT Pub. Date: May 3, 2007

(65) Prior Publication Data
US 2010/0022193 A1    Jan. 28, 2010

(51) Int. Cl.
*H04B 1/02* (2006.01)
*H04B 7/02* (2006.01)

(52) U.S. Cl.
USPC .................. 455/101; 455/562.1; 375/299

(58) Field of Classification Search .................. 455/424, 455/425, 456.5, 456.6, 561, 550.1, 575.1, 455/11.1, 67.11, 437, 562.1, 101–103, 133–137, 272, 277.1, 277.2; 375/261, 232, 347, 310, 375/267, 349, 299; 370/280, 294; 333/159
See application file for complete search history.

(56) References Cited

U.S. PATENT DOCUMENTS

| | | | | |
|---|---|---|---|---|
| 5,504,465 A | * | 4/1996 | Yung et al. | 332/145 |
| 5,930,293 A | | 7/1999 | Light et al. | |
| 5,982,825 A | * | 11/1999 | Tsujimoto | 375/347 |

(Continued)

FOREIGN PATENT DOCUMENTS

| | | |
|---|---|---|
| EP | 1 164 718 A2 | 12/2001 |
| EP | 1267501 A2 | 12/2002 |

(Continued)

OTHER PUBLICATIONS

A. Wittneben, "A New Bandwidth Efficient Transmit Antenna Modulation Diversity Scheme for Linear Digital Modulation," ICC Conference, pp. 1630-1634, Geneva (May 1993).

(Continued)

*Primary Examiner* — Nhan Le
(74) *Attorney, Agent, or Firm* — Finnegan, Henderson, Farabow, Garrett & Dunner, L.L.P.

(57) ABSTRACT

A system for diversity processing a signal propagated via two diversity antennas includes: respective propagation paths for propagating two replicas of the signal, these propagation paths being coupled to the two diversity antennas so that the replicas are propagated via different antennas; a time variable delay element for subjecting at least one of the replicas to a time variable delay; and a level adjusting element, such as an asymmetric splitter, to produce a level imbalance between the power levels of the replicas propagated via the two diversity antennas.

22 Claims, 27 Drawing Sheets

U.S. PATENT DOCUMENTS

| | | | |
|---|---|---|---|
| 6,154,652 A * | 11/2000 | Park et al. | 455/437 |
| 6,259,730 B1 * | 7/2001 | Solondz | 375/232 |
| 6,438,389 B1 | 8/2002 | Sandhu et al. | |
| 6,658,269 B1 * | 12/2003 | Golemon et al. | 455/562.1 |
| 6,907,272 B2 | 6/2005 | Roy | |
| 6,917,597 B1 * | 7/2005 | Schmidl et al. | 370/280 |
| 6,992,621 B2 | 1/2006 | Casas et al. | |
| 7,062,294 B1 | 6/2006 | Rogard et al. | |
| 7,155,192 B2 | 12/2006 | Ghassemzadeh et al. | |
| 7,403,748 B1 | 7/2008 | Keskitalo et al. | |
| 7,433,713 B2 * | 10/2008 | Haskell et al. | 455/562.1 |
| 7,450,907 B2 * | 11/2008 | Shurvinton et al. | 455/67.11 |
| 7,653,149 B2 * | 1/2010 | Strich et al. | 375/310 |
| 7,697,626 B2 | 4/2010 | Wang et al. | |
| 8,185,161 B2 | 5/2012 | Haskell et al. | |
| 2001/0016504 A1 | 8/2001 | Dam et al. | |
| 2002/0187813 A1 | 12/2002 | Guo | |
| 2002/0190790 A1 * | 12/2002 | Cheng et al. | 330/51 |
| 2004/0087294 A1 | 5/2004 | Wang | |
| 2004/0224655 A1 | 11/2004 | Petrov et al. | |
| 2004/0234012 A1 | 11/2004 | Rooyen | |
| 2004/0266338 A1 * | 12/2004 | Rowitch | 455/7 |
| 2005/0025271 A1 | 2/2005 | Molish et al. | |
| 2005/0143037 A1 | 6/2005 | Stratis et al. | |
| 2005/0163270 A1 | 7/2005 | Akita et al. | |
| 2005/0181831 A1 | 8/2005 | Doi | |
| 2005/0227619 A1 | 10/2005 | Lee et al. | |
| 2005/0287692 A1 | 12/2005 | Kim et al. | |
| 2006/0079221 A1 | 4/2006 | Grant et al. | |
| 2007/0080886 A1 | 4/2007 | Thomas et al. | |
| 2007/0093269 A1 | 4/2007 | Leabman | |
| 2007/0205943 A1 | 9/2007 | Nassiri-Toussi et al. | |
| 2010/0322336 A1 | 12/2010 | Nabar et al. | |
| 2011/0097992 A1 * | 4/2011 | Goransson et al. | 455/7 |
| 2011/0261805 A1 * | 10/2011 | Landry et al. | 370/342 |
| 2011/0274194 A1 * | 11/2011 | Feher | 375/261 |
| 2011/0312269 A1 * | 12/2011 | Judd et al. | 455/11.1 |
| 2012/0039410 A1 * | 2/2012 | Feher | 375/261 |
| 2012/0069131 A1 * | 3/2012 | Abelow | 348/14.01 |
| 2012/0099668 A1 * | 4/2012 | Sakata et al. | 375/267 |

FOREIGN PATENT DOCUMENTS

| | | |
|---|---|---|
| EP | 1475904 A2 | 11/2004 |
| EP | 1 487 134 A1 | 12/2004 |
| EP | 1489758 A1 | 12/2004 |
| WO | WO 02/03568 A1 | 1/2002 |
| WO | WO 03/055097 A3 | 7/2003 |
| WO | WO 2006/023247 A1 | 3/2006 |
| WO | WO 2006/037364 A1 | 4/2006 |
| WO | WO 2007/019185 A2 | 2/2007 |
| WO | WO 2007/038969 A1 | 4/2007 |
| WO | WO 2008/064696 A1 | 6/2008 |

OTHER PUBLICATIONS

S. Kim et al., "Time-Delay Phase Shifter Controlled by Piezoelectric Transducer on Coplanar Waveguide," IEEE Microwave and Wireless Components Letters, vol. 13, No. 1, pp. 19-20 (Jan. 2003).

J. Lee et al., CDMA Systems Engineering Handbook, pp. 256-262 (1998).

"(O)RLANS in the Frequency Band 2400-2483.5 MHz", Electronic Communications Committee (ECC) within the European Conference of Postal and Telecommunications Administrations (CEPT), ECC Report 57, pp. 1-17, (2004).

Fahmy et al.; "Ad Hoc Networks with Smart Antennas Using IEEE 802.11-Based Protocols", ICC 2002, 2002 IEEE International Conference on Communications, Conference Proceedings, pp. 3144-3148, (2002).

European International Search Report for International Application No. PCT/EP2007/011140, mailing date Oct. 28, 2008.

* cited by examiner

Fig. 1

| Transmission mode | Modulation | Maximum Throughput [kbps] | Coding Rate |
|---|---|---|---|
| MCS-9 | 8 PSK | 59.2 | 1 |
| MCS-8 | | 54.5 | 0.92 |
| MCS-7 | | 44.8 | 0.76 |
| MCS-6 | | 29.6 | 0.49 |
| MCS-5 | | 22.4 | 0.37 |
| MCS-4 | GMSK | 17.6 | 1 |
| MCS-3 | | 14.8 | 0.8 |
| MCS-2 | | 11.2 | 0.66 |
| MCS-1 | | 8.8 | 0.53 |

Fig. 2

| Transmission mode (TM) | Number of HS-PDSCH codes (NC) | Modulation (MOD) | Maximum Throughput [kbps] (MT) | Coding Rate (CR) |
|---|---|---|---|---|
| 1 | 1 | QPSK | 68.5 | 0.14 |
| 2 | 1 | QPSK | 86.5 | 0.18 |
| 3 | 1 | QPSK | 116.5 | 0.24 |
| 4 | 1 | QPSK | 158.5 | 0.33 |
| 5 | 1 | QPSK | 188.5 | 0.39 |
| 6 | 1 | QPSK | 230.5 | 0.48 |
| 7 | 2 | QPSK | 325 | 0.34 |
| 8 | 2 | QPSK | 396 | 0.41 |
| 9 | 2 | QPSK | 465.5 | 0.48 |
| 10 | 3 | QPSK | 631 | 0.44 |
| 11 | 3 | QPSK | 741.5 | 0.51 |
| 12 | 3 | QPSK | 871 | 0.60 |
| 13 | 4 | QPSK | 1139.5 | 0.59 |
| 14 | 4 | QPSK | 1291.5 | 0.67 |
| 15 | 5 | QPSK | 1659.5 | 0.69 |
| 16 | 5 | 16-QAM | 1782.5 | 0.37 |
| 17 | 5 | 16-QAM | 2094.5 | 0.44 |
| 18 | 5 | 16-QAM | 2332 | 0.49 |
| 19 | 5 | 16-QAM | 2643.5 | 0.55 |
| 20 | 5 | 16-QAM | 2943.5 | 0.61 |
| 21 | 5 | 16-QAM | 3277 | 0.68 |
| 22 | 5 | 16-QAM | 3584 | 0.75 |

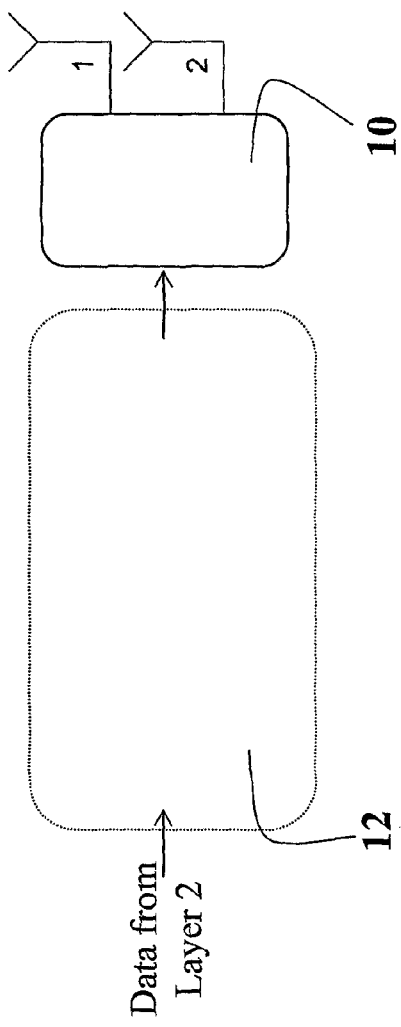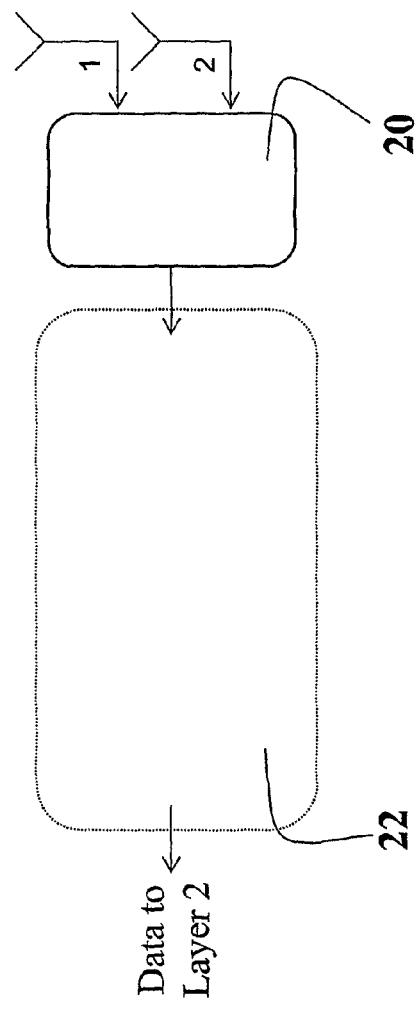

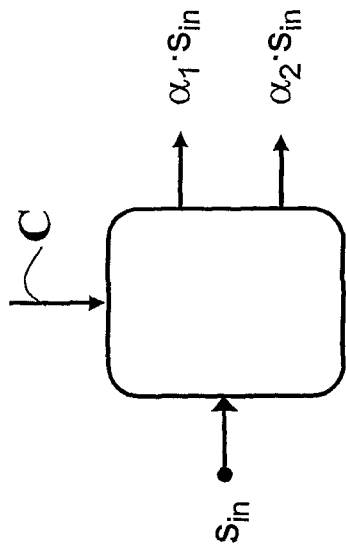
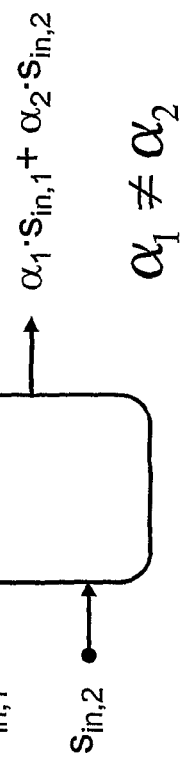
Fig. 4a
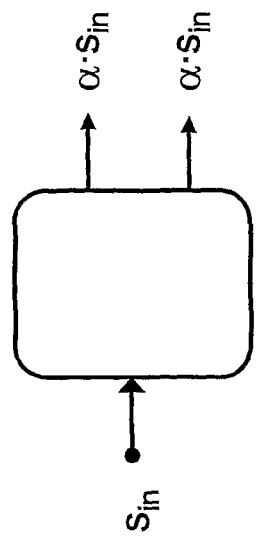
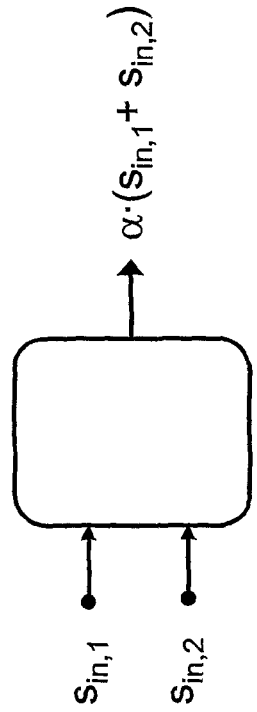
Fig. 4b

METHOD AND SYSTEM FOR MULTIPLE ANTENNA COMMUNICATIONS USING MULTIPLE TRANSMISSION MODES, RELATED APPARATUS AND COMPUTER PROGRAM PRODUCT

CROSS REFERENCE TO RELATED APPLICATION

This application is a national phase application based on PCT/EP2005/011529, filed Oct. 27, 2005, the content of which is incorporated herein by reference.

FIELD OF THE INVENTION

The present invention relates to wireless communication systems. The invention was developed by paying specific attention to the possible application in radio transmitters and receivers.

DESCRIPTION OF THE RELATED ART

Radio transmitters and receivers used in systems that provide voice and data services by means of multiple transmission mode currently adopt different transmission modes characterized by different transmission parameters such as e.g. the channel coding rate.

Examples of these communication systems are GPRS (General Packet Radio Service), EDGE (Enhanced Data rates for Global Evolution) and HSDPA (High Speed Downlink Packet Access) that has been recently introduced in the UTRA (UMTS Terrestrial Radio Access) Release 5 specifications.

The idea underlying the wireless communication systems listed above is to adapt the transmission parameters in order to take advantage of prevailing channel conditions. The basic parameters adapted typically include channel coding rate and modulation. However, other quantities can be adjusted during communication for the benefit of the system. This adaptive approach, denoted in literature as Link Adaptation (LA), is now widely recognized as a key solution to increase the spectral efficiency of wireless communication systems.

FIG. 1 of the annexed drawing illustrates a set of transmission modes (MCS-1 to MCS-9) suitable for use in an EDGE system. Each mode listed in the left-hand column (Transmisson Mode or TM) is identified by the type of modulation (MOD—i.e. 8 PSK or GMSK) and the channel coding rate (i.e. the ratio of the "useful", payload bits to the total number of bits transmitted—right-hand column CR). The modes are listed in the figure in a decreasing order in terms of the maximum throughput (third column TM) in kbps, whereby MCS-9 and MCS-1 are the first and the last mode in the list, respectively. Since each mode has a different maximum data rate (expressed in bits per second) and robustness level (minimum signal-to noise ratio needed to activate the mode), the modes are optimal for use in different channel quality regions.

The goal of link adaptation is thus always to ensure that the most efficient mode is used, over varying channel conditions, based on a mode selection criterion (maximum data rate, minimum transmit power, and so on). For instance, by considering the example of the EDGE system in FIG. 1, the transmission mode denoted as MCS-1 ensures the highest protection of the transmitted information as it uses a low channel coding rate, of about 0.5, and a robust modulation scheme such the GMSK (Gaussian Minimum Shift Keying) modulation. Similarly, the transmission mode denoted as MCS-5 provides a high level of protection of the transmitted information because it uses a channel coding rate of about 0.37 and uses the 8-PSK modulation scheme, which is less robust than the GMSK but is able to provide a throughput three times higher. These two transmission modes are selected under unfavourable channel conditions, as it may occur when the user is located at the cell edge.

On the other hand, the transmission mode denoted as MCS-9 ensures the lowest protection of the information transmitted as it does not use any channel coding scheme and the coding rate is unitary. This transmission mode ensures the highest throughput and is used under very good channel conditions, as for example when the user is located near to the base station.

HSDPA may be considered as a further example of a wireless system that uses multiple transmissions modes with different coding rates and modulations. HDSPA (High Speed Downlink Packet Access) is a new feature introduced in 3GPP Release 5 specifications of UTRA. It includes a wide range of physical layer solutions able to increase user peak data rate and cell throughput, supporting a new downlink shared transport channel. The physical layer solutions include in particular multiple transmission modes characterized by different modulation and coding rates.

The characteristics of some of the HSDPA transmission modes (1 to 22—column labelled TM) are listed in FIG. 2, for the User Equipment (UE) categories 1 to 6, with a number of spreading codes allocated to the High Speed Physical Downlink Shared CHannel (HS-PDSCH) between 1 and 5 (column labelled NC). Modulation (MOD) may be either QPSK (for modes 1 to 15) or 16-QAM (for modes 16 to 22). The modes are listed in increasing order in terms of maximum throughput (MT) in kbps. Here again, the channel coding rate (CR) varies from very low values of about ⅕ to rather high values of about ¾.

Unless otherwise indicated, the acronyms and abbreviations appearing in FIGS. 1 and 2 are well known to those of skill in the art, thus making it unnecessary to provide more detailed explanations herein.

Even when using link adaptation techniques, the spectral efficiency of current wireless networks may still be insufficient to satisfy the growing throughput demand by the users, originated by the increased penetration of new data services. Moreover, these new data services are likely to be used in—potentially adverse—low mobility conditions by still or walking users in indoor or pedestrian scenarios.

Antenna diversity is a technique that can be used to improve spectral efficiency and to reduce the negative effects of prolonged multi-path fading in wireless systems. In diversity transmission (and, similarly, in diversity reception), two or more physically separated antennas (space diversity) or one or more cross-polarized antenna (polarization diversity) are respectively used to transmit or receive a given signal. By placing the antennas at a sufficient distance or by using a +/−45 degrees slant cross-polarized antennas it is possible minimize the amplitude correlation of the signals transmitted or received by the different antennas. In practice, the physical separation between the antennas is limited due to size or environmental constraints and thus the signals can have a significant amplitude correlation. A significant signal correlation can also be present in the signals transmitted or received through cross polarized antennas, in particular when the vertical to horizontal polarization power ratio, also referred to as cross-polar discrimination (XPD), takes high values.

The arrangement described in the article of A. Wittneben "A New Bandwidth Efficient Transmit Antenna Modulation Diversity Scheme for Linear Digital Modulation", ICC Conference—pages 1630-1634, Geneva, May 1993 is exemplary of antenna diversity including a fixed delay diversity (DD) between antennas.

Another fixed DD receiver arrangement is described in U.S. Pat. No. 5,930,293. This document describes the application of the fixed DD technique for achieving antenna receive diversity in a wireless repeater. The repeater is equipped with two receiving antennas for receiving a signal from a wireless terminal. The signal received from one of the antennas is subject to a fixed delay and is recombined at RF with the other received signal. The combined signal is subsequently transmitted to the base station by means of a third antenna. The fixed delay is chosen at least equal to two chip periods in order to enable the Rake receivers in the base station to resolve and coherently combine the two signals.

The document WO-A-03/055097 describes a method for providing Phase Shift Transmit Diversity (PSTD) in a wireless communication system. A base station modulates the phase of a first signal with a reference signal to produce a first phase modulated signal. Further, the base station modulates the phase of a second signal with a different reference signal to produce a second phase modulated signal. The second phase shift is distinct from the first phase shift such that the second phase modulated signal is diverse relative to the first phase modulated signal. Accordingly, the base station transmits the first phase modulated signal via a first antenna and the second phase modulated signal via a second antenna to a plurality of mobile stations.

PCT Applications PCT/EP2004/011204 and PCT/EP2005/010799 disclose antenna diversity techniques that improve radio link performance by reducing the temporal autocorrelation of the signals transmitted/received in low mobility scenarios and also minimize the cross-correlation among the signals received by the different antennas. These arrangements are applicable in wireless systems that have already been standardized, with minimal modifications on the deployed equipments and networks.

These antenna diversity arrangements essentially rely on Dynamic Delay Diversity (DDD), i.e. a time variable delay diversity. These DDD techniques introduce a time variable delay on the signals transmitted and/or received by the different antennas. The delay required to make the technique effective is significantly smaller when compared to other diversity techniques. In general, the required delay varies between zero and the period of the RF (carrier) signal $T_0$. Because of the low value of delay to be introduced, the implementation problems related to size, cost and transmission losses of the delay line, are significantly reduced in case of the DDD technique with respect to other antenna diversity techniques such fixed Delay Diversity (fixed DD). The DDD technique also dispenses with certain problems that are intrinsic to Phase Shift Transmit Diversity (PSTD) techniques, such as e.g. high insertion loss and non-linearity of RF phase shifter devices.

These systems lead to significant improvements in terms of link level performance in slow fading scenarios and for wireless systems that use robust channel coding techniques with coding rates lower or equal to ½.

OBJECT AND SUMMARY OF THE INVENTION

Despite the significant improvement represented by the Dynamic Delay Diversity techniques discussed in the foregoing, the need is still felt for a diversity technique that may be advantageously applied in those wireless systems as those discussed in the introductory part of this description, namely those system that use multiple transmission modes and are characterized by different channel coding rates ranging from one (unencoded transmission) to low values (e.g. $\leq ½$) obtained with powerful coding schemes.

The object of the present invention is thus to provide an arrangement suitable for application in those communication systems that adapt to varying channel conditions by using different transmission modes. A specific object of the present invention is to provide an arrangement that, in the case of uncoded (e.g. EDGE mode MCS-9) or near-to-uncoded transmission, avoids that the distribution of the errors over the received data stream may cause an increase of the Block Error Rate (BLER) and thus a reduction of the user data rate.

According to the present invention, that object is achieved by means of a method having the features set forth in the claims that follow. The invention also relates to a corresponding system, a related apparatus as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion. The claims are an integral part of the disclosure of the invention provided herein.

A preferred embodiment of the invention is thus a method of diversity processing at least one signal propagated (i.e. transmitted and/or received) via at least two diversity antennas, the method including the steps of:
  propagating at least two replicas of said at least one signal over respective propagation (i.e. transmission and/or reception) paths coupled to said at least two diversity antennas, whereby said replicas are propagated via different antennas;
  subjecting at least one of said replicas to a time variable delay; and
  adjusting the power levels of said at least two replicas (e.g. via asymmetric splitters and/or combiners and/or or by applying different gains/attenuations over the respective propagation paths) to produce a level imbalance therebetween.

The arrangement described herein thus comprises a new method and a related circuit for the application of a Dynamic Delay Diversity (DDD) technique. The method and DDD circuit described herein are suitable for application in communication systems that adapt to varying channel conditions by using different transmission modes. The transmission modes are typically characterized by channel coding rates variable from 1 (unencoded transmission) to very low values (e.g. ⅓ or ⅕) obtained with powerful coding schemes.

Typically, the arrangement described herein is applied to at least one signal transmitted by selectively using one of a plurality of transmission modes (e.g. MCS-1 to MCS-9; 1 to 22, as discussed previously) and said level imbalance is selected as a function of the transmission modes used, e.g. by using the level imbalance/difference giving the best results in connection with the transmission mode having the highest probability of being used. In the case where the transmission mode used is varied during transmission (e.g. to cope with varying channel characteristics) the level imbalance can be adaptively varied as a function of the current transmission mode used.

GPRS, EDGE, HSDPA (i.e. UMTS), and HDR (i.e. CDMA-2000) are exemplary of wireless systems that represent a possible field of application of the arrangement described herein. However, other wireless communication systems that use multiple transmission modes with large variation of the channel coding rates represent a possible field of application for the arrangement described herein.

A preferred field of application of the arrangement described herein is in multi-carrier cell sites, in which the available carrier frequencies are divided among different transmission systems such GSM and GPRS/EDGE providing voice and packet data services respectively.

BRIEF DESCRIPTION OF THE ANNEXED REPRESENTATIONS

The invention will now be described, by way of non-limiting example only, with reference to the annexed representations, wherein:

FIGS. 1 and 2 have been already described in the foregoing;

FIG. 3 includes two portions, designated 3a and 3b, representative of the general context of application of the arrangement described herein within a transmitter and a receiver, respectively;

FIG. 4 again includes two portions, designated 4a and 4b, that are exemplary of the basic characteristics of certain components included in the arrangement described herein;

FIGS. 5 and 6 are schematic block diagrams of possible embodiments of a diversity arrangement as described herein when applied on the transmitter side;

FIG. 7 includes two portions, designated 7a and 7b, that are exemplary of the basic characteristics of certain components included in the arrangement described herein;

DETAILED DESCRIPTION OF EXEMPLARY EMBODIMENTS OF THE INVENTION

Figure 5:
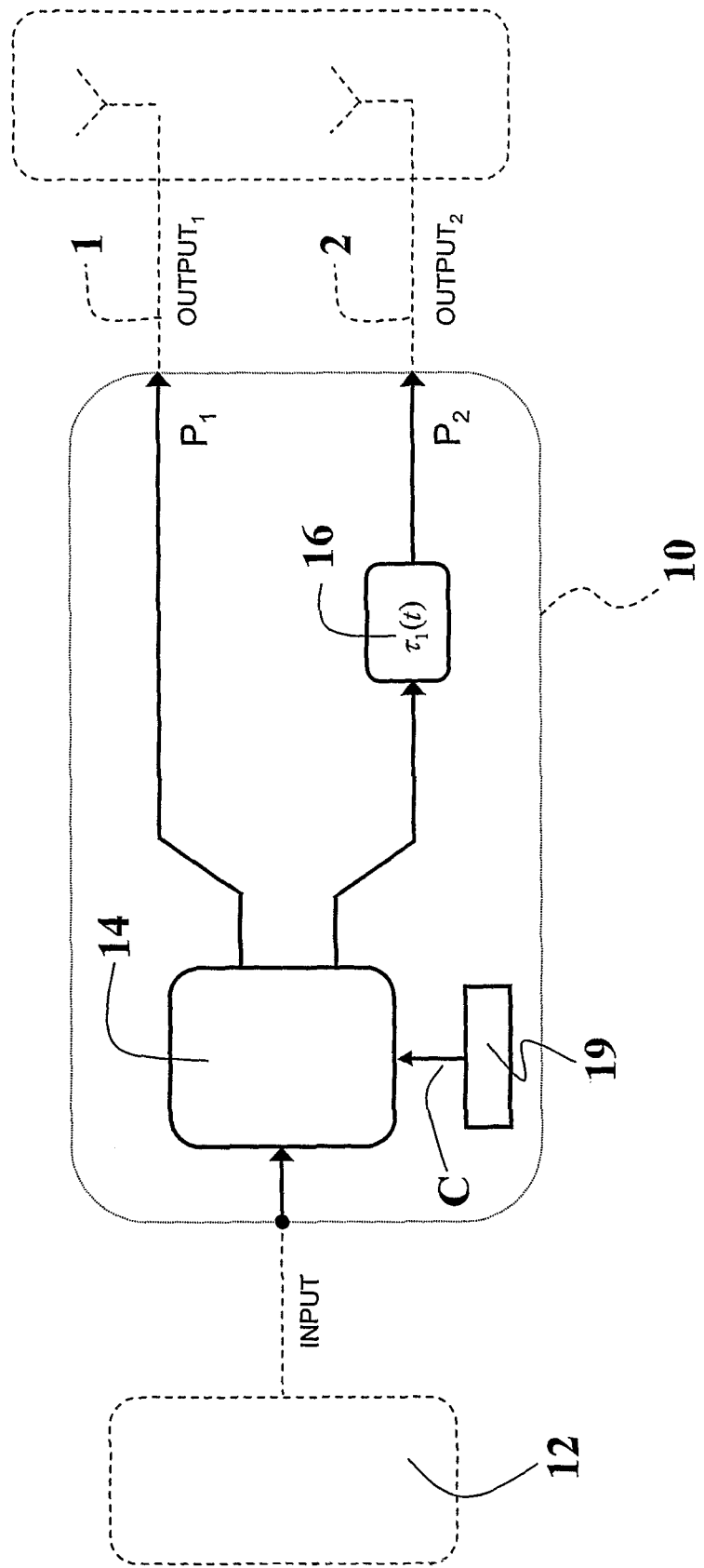

As indicated in the foregoing, the diversity arrangement described herein relies on the introduction of a time variant delay on the signals transmitted and/or received by the different antennas. Typically the delay is significantly smaller when compared to other diversity techniques. In general, if RF or IF signals modulated over a carrier are being processed according to the diversity arrangement described herein, the delay applied varies between zero and the period $T_0$ of the carrier signal.

For example, the application of the technique described herein in a base station transceiver compliant with the GPRS/EDGE standard involves the introduction of a delay that varies between zero and the carrier period $T_0=1/890$ MHz=1.1 nanoseconds. More generally, the delays typically considered for the arrangement described herein vary between zero and values in the range between tenths of nanoseconds (ns) and units of nanoseconds (ns).

The technique is realized by means of a diversity processor 10 (transmission or TX) that is connected at the output of a conventional transmitter 12, as shown in FIG. 3a, or a diversity processor 20 (reception or RX) that is connected at the input of a conventional receiver 22 as shown in FIG. 3b.

Specifically, in FIGS. 3a and 3b digital signals (e.g. Layer 2 data in a mobile communication system—not shown as a whole) are transmitted (FIG. 3a) or received (FIG. 3b) via two diversity antennas 1 and 2. The transmitter 12 and the receiver 22 include otherwise conventional circuitry such as e.g. baseband processors, digital-to-analog (DAC) and analog-to-digital (ADC) converters, IF/RF transmitters/receivers, and so on. At least some of the embodiments detailed in the following relate to diversity processors that are "reciprocal" in that they may act both on signals being transmitted and on signals being received via the antennas 1, 2. These reciprocal arrangements will thus be in a position to be connected to and to cooperate with (in an otherwise known manner) with a "transceiver" that combines a transmitter 12 and a receiver 22.

In the following, various alternative implementations of diversity processors exploiting the principle of Dynamic Delay Diversity DDD are described. These will be generally denoted DDD TX processors (transmit diversity) or DDD RX processors (receive diversity). In the various specific embodiments considered, these TX or RX (or TX/RX, in the case of "reciprocal" embodiments) diversity processors will include various elements or components such as signal splitters, combiners, Time Variant Delay Lines (TVDL), Power Amplifiers (PA), Low Noise Amplifiers (LNA), etc. Unless otherwise specified, these elements are substantially the same in the various embodiments; these embodiments thus essentially differ in the number, type and way the various elementary blocks are combined to produce different structures of a diversity processor.

As better detailed in the following, the time varying delay required can be obtained using a delay line based on a waveguide or a microstrip device. Both devices, obtained using standard technologies as in commercial devices, are limited in power handling, where the limiting values are presently in the range of 33-35 dBm. This is not an issue for receive diversity applications, but might represent a limiting factor for transmission diversity applications: in several cases, in particular in the case of macro base station (for both 2G and 3G), this limiting value may not be compatible with the typical value of the transmitted power.

However, the asymmetric DDD TX processors described here involve i.a. an asymmetric splitting of the power transmitted. The power level associated to the signal replica(s) subjected to the time varying delay may thus be reduced, which largely facilitates the implementation of several architectures proposed in the following by using commercial devices.

In the following description, the designation signal splitter—see FIG. 4a—will apply to any device capable of splitting (i.e. dividing) an input signal $S_{in}$ in two parts or replicas.

Such a splitter may either be:
a symmetric splitter (see FIG. 4a—left hand side), capable of splitting (i.e. dividing) an input signal $S_{in}$ in two parts or replicas $\alpha$. $S_{in}$ having the same power level; or
an asymmetric splitter (see FIG. 4a—right hand side), capable of splitting an input signal $S_{in}$ in two parts or replicas $\alpha_1$. $S_{in}$ and $\alpha_2$. $S_{in}$, with $\alpha_1$ different from $\alpha_2$, having different power levels.

Similarly, the designation signal combiner—see FIG. 4b—will apply to any device capable of combining (i.e. adding) two parts or replicas $S_{in,1}$, $S_{in,2}$ of a given signal $S_{in}$.

Such a combiner may either be:

- a symmetric combiner (see FIG. 4b—left hand side), capable of combining (i.e. adding) two parts or replicas $S_{in,1}$, $S_{in,2}$ by applying to both the same "weights" $\alpha$, to produce a combined signal $S_{in} = \alpha \cdot S_{in,1} + \alpha \cdot S_{in,2}$ or $S_{in} = \alpha (S_{in,1} + S_{in,2})$; or
- an asymmetric combiner (see FIG. 4b—right hand side), capable of combining (i.e. adding) the two parts or replicas $S_{in,1}$, $S_{in,2}$ by applying to them different "weights" $\alpha_1$, $\alpha_2$, with $\alpha_1$ different from $\alpha_2$, to produce a combined signals $S_{in} = \alpha_1 \cdot S_{in,1} + \alpha_2 \cdot S_{in,2}$.

Practical implementations of splitters/dividers—both symmetric and asymmetric—also for RF/IF operation, are conventional in the art and do not require to be described in detail here. A splitter implemented with passive components (e.g. as a resistor voltage divider) will generally be reciprocal, in that it will act as a combiner for the signals that propagate in the opposite direction. This characteristic is exploited in the reciprocal DDD processors described in the following, which can be used simultaneously for transmission and reception.

The right hand side portions of FIGS. 4a and 4b highlight the possibility for an asymmetric splitter/combiner to include a control line C whereby the factors/weights $\alpha_1$ and $\alpha_2$ can be changed to correspondingly vary the difference/imbalance $\Delta$. As better detailed in the following, these factors/weights may be adjusted as a function of a transmission mode used e.g. by selecting the level imbalance/difference giving the best results in connection with the transmission mode having the highest probability of being used. Alternatively these factors/weights may be adaptively varied during transmission as a function of the current transmission mode used.

A first architecture of a DDD TX processor 10 is shown in FIG. 5. This processor is suitable for application with conventional transmitters 12 that do not support any form of transmission antenna diversity. Thus, in this case the conventional transmitter provides a single output signal. The DDD TX processor 10 includes an asymmetric splitter 14 that divides the input signal in two parts or replicas. The powers of the signals at the output of the asymmetric splitter are different.

The power imbalance or difference thus created between the two signals to be transmitted via the diversity antennas 1 and 2 is a design parameter that allows the application of the DDD processor in wireless systems that use multiple transmission modes with different coding rates.

Specifically, by denoting with $P_1$ and $P_2$ the powers radiated by the two antennas, the DDD power imbalance $\Delta$ (in dB) is defined as follows $$\Delta = 10 \cdot \log_{10}\left(\frac{P_1}{P_2}\right) \; [dB] \tag{1}$$

The first signal with power $P_1$ is propagated (i.e. radiated) by the first antenna 1. The second signal with power $P_2$ is provided to a Time Variant Delay Line (TVDL) 16 that introduces a time variant delay $\tau_1(t)$ on the signal radiated by the second antenna 2.

By denoting with x(t) the signal at the output of the conventional transmitter, the two transmitted signal $y_1(t)$ and $y_2(t)$ can be expressed as follows $$y_1(t) = \alpha_1 \cdot x(t)$$

$$y_2(t) = \alpha_2 \cdot x(t - \tau_1(t)) \tag{2}$$

where the amplitude coefficients $\alpha_1$ and $\alpha_2$ depend on the characteristic of the asymmetric splitter.

These coefficients may be possibly varied via the line C. This may either be in the form of a "una tantum" trimming of the system or in the form of automatic adjustment under the control of a block 19 sensitive to the current transmission mode used (e.g. any of the modes MCS-1 to MCS-9 or 1 to 22 contemplated in FIGS. 1 and 2).

Figure 6:
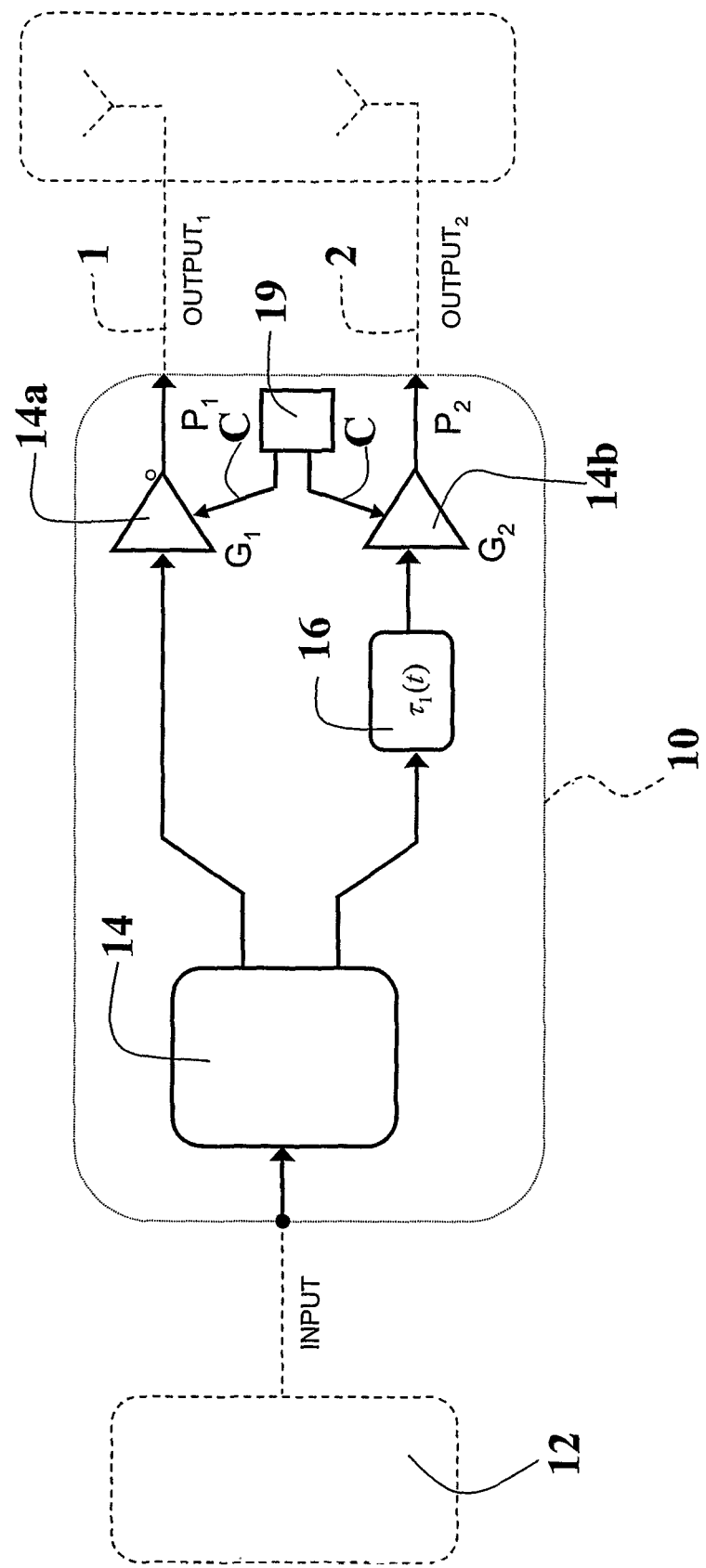

A power imbalance between the signals transmitted by the two antennas 1, 2 can also be obtained by resorting to the alternative arrangement illustrated in FIG. 6, where the same reference numerals already appearing in FIG. 5 are used to denote identical/equivalent components to those already described.

In the arrangement of FIG. 6, the splitter 14 is a symmetric splitter and two power amplifiers (PA) 14a and 14b with different gains $G_1$ and $G_2$ are inserted in the propagations paths of the two replicas of the signal produced by the splitter 14 towards the antennas 1, 2.

The symmetric splitter 14 provides in this case two output signals with the same power. The power imbalance or difference between the two signals to be transmitted via the diversity antennas 1 and 2 is thus produced by acting on the two gains $G_1$ and $G_2$ of the amplifiers 14a and 14b. The power imbalance or difference thus created allows the application of the DDD processor in wireless systems that use multiple transmission modes with different coding rates. Here again, a first signal with a first power level is propagated (i.e. radiated) by the first antenna 1, and the second signal with a second power level is processed (preferably before amplification at 14b) to a Time Variant Delay Line (TVDL) 16 that introduces a time variant delay $\tau_1(t)$ on the signal radiated by the second antenna 2.

The amplitude coefficients $\alpha_1$ and $\alpha_2$ of the formulas introduced in the foregoing are here dictated by the gains $G_1$ and $G_2$ of the amplifiers 14a and 14b. These gains/coefficients may again be possibly varied via respective control inputs C. This may be in the form of trimming of the system or in the form of automatic adjustment under the control of the block 19.

The architecture illustrated in FIG. 6 has the advantage that the delay element 16 can be realized with low power handling components.

The DDD TX processor architecture illustrated in FIG. 6 is particularly adapted for communication networks that use Remote Radio Head (RRH) units. A RRH is a compact unit that is mounted near the antenna and integrates several base station functions for transmission and reception. The transmission functions that are typically integrated in the RRH unit are digital to analog conversion (DAC), frequency up-conversion, digital pre-distortion and MCPA (Multi Carrier Power Amplifier). The receiving functions that are integrated in the RRH are the RF front-end, frequency down-conversion and analog to digital conversion (ADC).

The RRH unit is fed from the remainder of the base station with baseband (I/Q) signals via optical fibre cables. The interface between the RRH and the baseband modem is normally compliant with the Common Public Radio Interface (CPRI) standard or with the interface defined by the OBSAI (Open Base Station Standard Initiative) forum. The baseband modem can be relocated from a cabinet near to the antenna to a remote location with clear benefits in terms of deployment costs and network management.

Figure 7A:
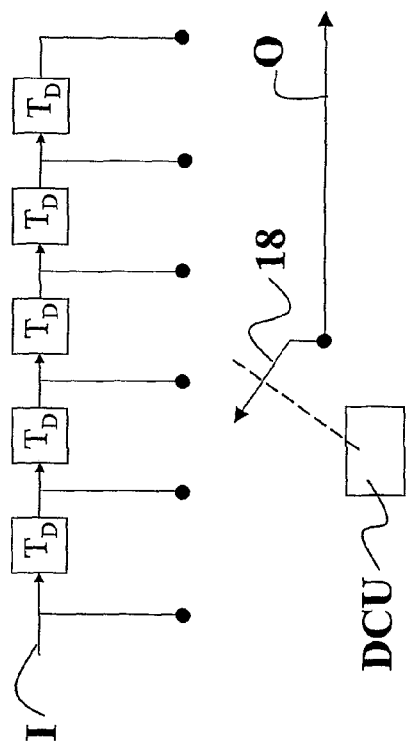

FIG. 7a shows a first exemplary implementation of the time variable delay line 16 (and any other time variable delay line referred to in the rest of this description) in the form of a tapped delay line, namely as the cascade of elementary delay units. Each of such delay unit (e.g. a transmission line stub) generates for example a delay $T_D$ of 0.1 ns. The various tap points in the line come down to a RF switch 18. The switch is controlled by a delay control unit (DCU) making it possible to select a particular tap of the tapped delay line and therefore a given value of the delay introduced by the block. Changing the position of the switch 18 makes it possible to change the value of the delay.

Figure 7B:
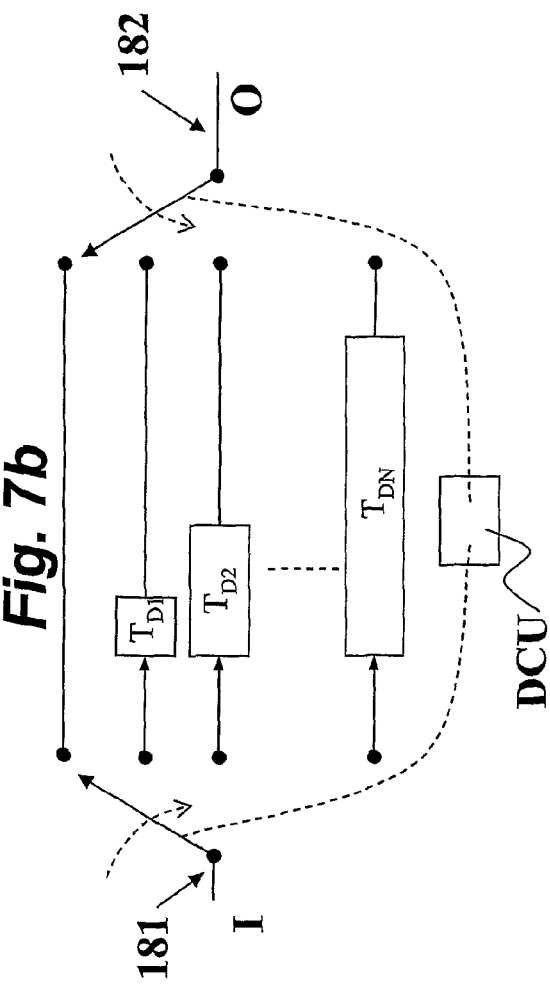

FIG. 7b shows a second exemplary implementation of the time variable delay line 16 (and any other time variable delay line referred to in the rest of this description) in the form of a plurality of delay elements (these may again be comprised of transmission line stubs) each producing for example a respective delay of TD1=0.1 ns., TD2=0.2 ns., TD3=0.3 ns., and so on. Two switches 181, 182 are controlled in a coordinated manner by the delay control unit (DCU) making it possible to select a particular delay element and therefore a given value of the delay introduced by the block. Changing the position of the switches 181, 182 makes it possible to change the value of the delay.

As an alternative to varying the delay in discrete steps, as shown in connection with the exemplary embodiments of FIG. 7a and FIG. 7b, in other possible implementations (not shown) of the delay line/element the delay is caused to vary continuously. A possible implementation of the delay line with continuous variation of the introduced delay can be found in the article "Time Delay Phase Shifter Controlled by Piezoelectric Transducer on Coplanar Waveguide", IEEE Microwave and Wireless Components Letters, Vol. 13, No. 1, pag. 19-20, January 2003. In particular, the continuous delay line may be implemented by inserting on a coplanar waveguide a piezoelectric transducer whose perturbations vary the effective dielectric constant of the coplanar waveguide.

Figure 8:
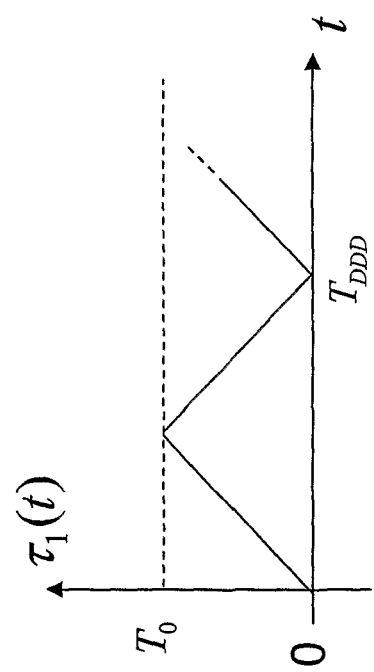
FIG. 8 is a diagram representative of a parameter involved in operation of the arrangement described herein.

The delay function $\tau_1(t)$, according to which the delay varies as a function of time, is not restricted to particular functions and can be a continuous function (e.g. linear, sinusoidal) or a discrete step function. An example of continuous delay function $\tau_1(t)$ is shown in FIG. 8, where $T_0$ is the carrier period and $T_{DDD}$ is the period of the delay function $\tau_1(t)$, which in the following will be designated the period of the DDD. $T_{DDD}$ is typically selected in the range between approximately one to tens of milliseconds.

Figure 9:
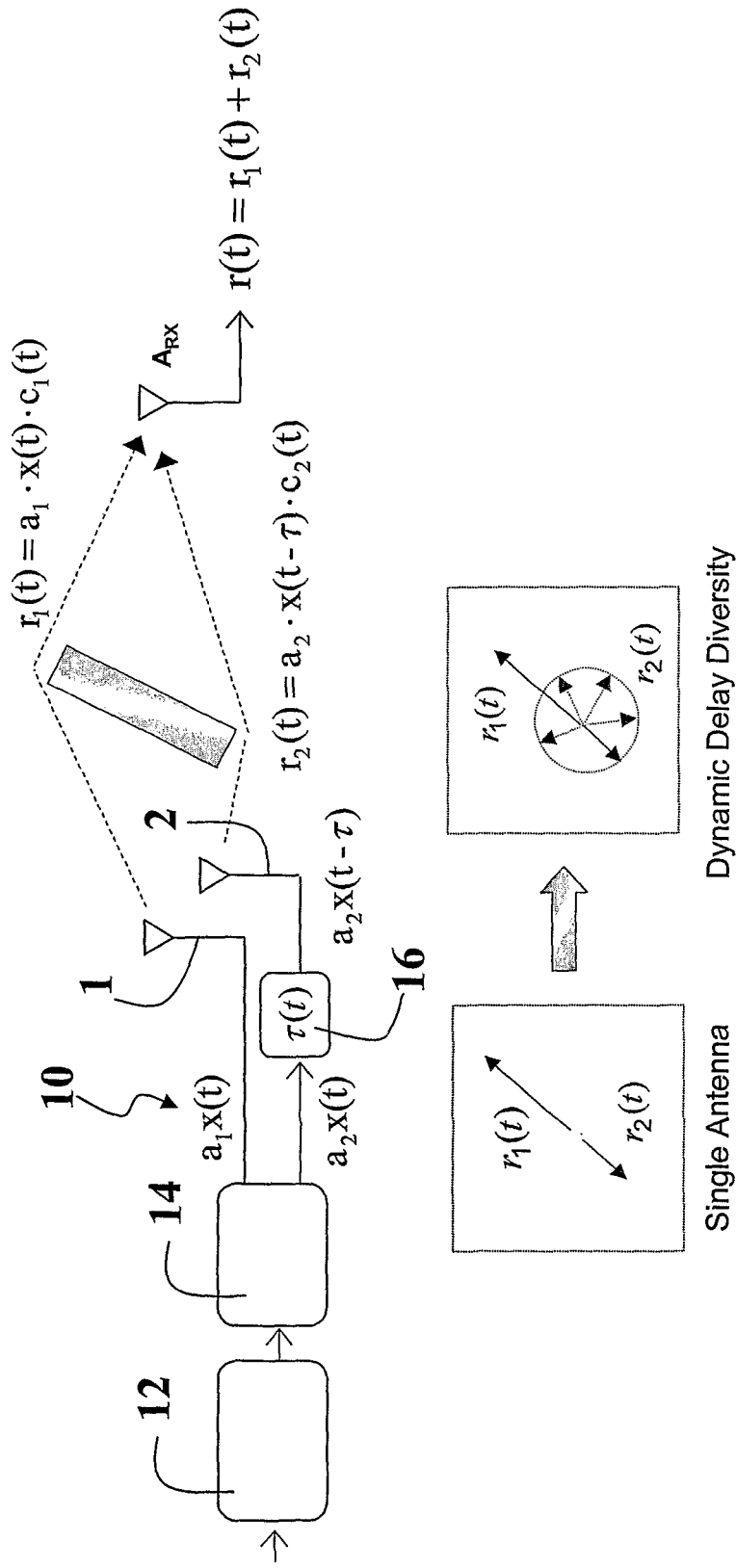
FIG. 9 is a functional block diagram representative of the basic principle underlying operation of the diversity arrangement as described herein.

The effect of the Dynamic Delay Diversity technique discussed here can be explained in connection with FIG. 9 by considering a single frequency component of the received signal. Here the antennas 1, 2 are assumed to be fed two signals $a_1 x(t)$ and $a_2 x(t-\tau)$.

The coefficients $a_1$ and $a_2$ incorporate the amplitude coefficients $\alpha_1$ and $\alpha_2$, plus other gain factors (assumed to be identical for both signals) inherent in the transmission chain through which the "useful" signal $x(t)$ is propagated, while $\tau$ is representative of the (dynamic) time delay applied to the signal transmitted via the antenna 2.

As a result of propagation over a transmission channel having channel coefficients $c_1(t)$ and $c_2(t)$ for the antennas 1 and 2, respectively, the signals received (again for the sake of simplicity, a single receiving antenna $A_{RX}$ will be considered) will take the form:

$$r_1(t)=\alpha_1 x(t) c_1(t)$$

$$r_2(t)=\alpha_2 x(t-\tau) c_2(t)$$

and will be summed as a resulting signal $r(t)=r_1(t)+r_2(t)$.

This is in fact equivalent to the sum of two phasors. The phasor $r_1(t)$ related to the signal transmitted by the first antenna, not subject to variable delay, varies according to the characteristic of the propagation channel. For example in indoor environments characterized by low user mobility, the amplitude and phase of this phasor have very slow variations. The second phasor $r_2(t)$, related to the signal transmitted by the antenna subject to variable delay, rotates with a frequency that is imposed by the period of the dynamic delay diversity DDD, as shown at the bottom of FIG. 9. The second phasor completes a rotation of 360° in a time interval equal to the period of the DDD (namely $T_{DDD}$).

The combination of the two phasors at the receiving antenna $A_{RX}$ produces a resultant signal that fades at a faster rate than the signal without DDD, due to the alternation of constructive (phasors recombine in phase) and destructive combination (phasors recombine with opposite phases). The average amplitude ratio of the two phasors is directly proportional to the power imbalance A set at the transmitter in the DDD processor. As a consequence, the amplitude depth of the fades induced by the DDD can be progressively reduced by means of the power imbalance.

The alternation of constructive and destructive combining reduces the length of the error bursts and thus improves the effectiveness of the transmission modes that use channel coding. The DDD technique thus affects the error statistics at the input of the channel decoder by making the error distribution more uniform over the received data stream (i.e. the error statistic becomes less bursty). The effectiveness of the channel decoding algorithms is then improved with a consequent reduction of the BLER after the decoding operation.

On the other hand, in the case of uncoded (e.g. EDGE mode MCS-9) or near-to-uncoded transmission the distribution of the errors over the received data stream may cause an increase of the BLER and thus a reduction of the user data rate. The power imbalance technique described herein provides an effective solution to this problem.

Figure 10:
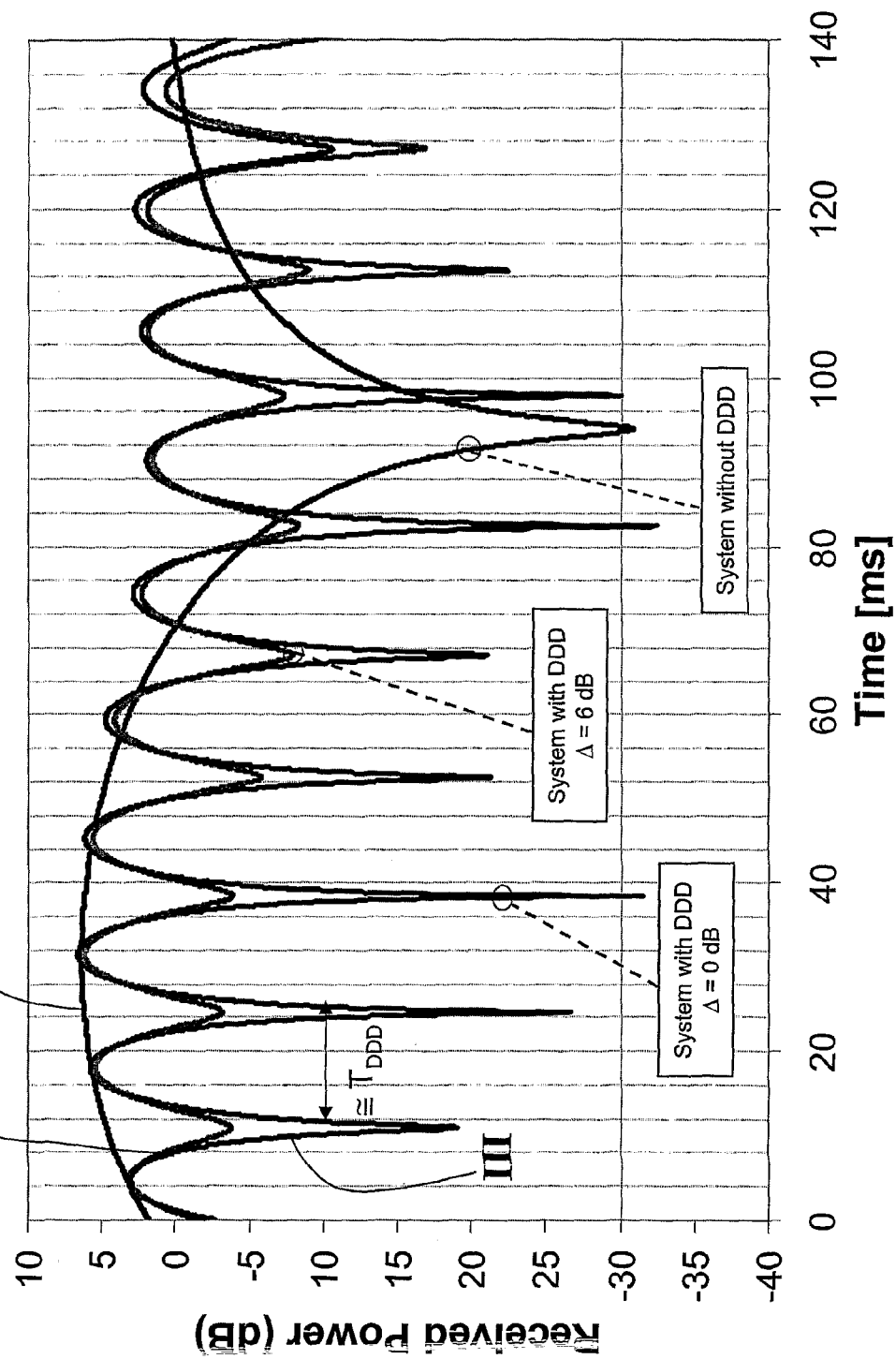
FIGS. 10 to 14 are diagrams illustrative of the results that may be achieved by using a diversity arrangement as described herein.

The effect of the DDD technique is shown in the diagrams of FIG. 10. Specifically, these diagrams provide a measure of the received signal power (ordinate scale) as a function of time (abscissa scale) in a system without DDD (diagram I) and in systems that use a DDD processor 10 at the transmitter (diagrams II and III). In this case the user speed is set equal to v=3 km/h and the configuration parameters of the DDD processor are $\Delta$=0 dB (balanced transmission—diagram II) or $\Delta$=6 dB (unbalanced transmission—diagram III) and DDD period equal to $T_{DDD}$=13 ms.

FIG. 10 shows that the amplitude depth of the fades caused by the DDD is reduced by transmitting two signals with different powers. A lower amplitude depth of the induced fades reduces the probability that a block of unencoded bits is received with errors and therefore avoids any BLER degradation for the unencoded transmission modes.

This result is confirmed by experiments documented in the following. A second remarkable advantage of the unbalanced configuration is the simplification of the time variable delay line design, since the power associated to the second antenna can be significantly reduced.

The effect of the power imbalance can be measured by means of a parameter that characterizes the fade occurrence on the received signal. This parameter is the fade rate or Level Crossing Rate (LCR). The LCR is dependent on the environment characteristics (e.g. position and structure of the scattering objects) and on the relative speed between transmitter and receiver. The natural value of LCR in a given environment (e.g. indoor) can be modified by means of the DDD technique in order to improve the link level performance of the communication system. In particular, LCR can be finely tuned by properly selecting the power imbalance $\Delta$ (line/input C of FIGS. 5 and 6) of the DDD processor in order to get optimal link performance with systems that use multiple transmission modes.

LCR is defined as the average rate at which the received signal envelope crosses a specified amplitude threshold A in a positive direction. The LCR is measured in number of fades per second, where the term fade means that the envelope crosses the threshold A. In case of a single path Rayleigh channel with classic Doppler spectrum the LCR can be calculated analytically, as demonstrated in "CDMA systems engineering handbook", J. Lee, L. Miller, pag. 256-262. In this particular case the theoretical expression of the LCR is equal to $$LCR = f_d \cdot \rho \cdot \sqrt{2\pi} \cdot e^{-\rho^2} \text{ [fades/s]} \quad (3)$$

where $\rho$ is the fade-depth parameter defined as the ratio between the signal envelope threshold A and the local RMS (Root Mean Square) signal level $$\rho = \frac{A}{A_{rms}} \quad (4)$$

and $f_d$ is the maximum Doppler spread given by $$f_d = f_0 \cdot \frac{v}{c} \text{ [Hz]} \quad (5)$$

with $f_0$ indicating the carrier frequency, $v$ the relative speed between transmitter and receiver and c the light speed. By substituting the equation (5) in the equation (3) we notice that, as expected, the LCR is proportional to the speed $v$. For example, by considering a received power threshold of 10 dB below the average signal power received, the fade depth parameter $\rho$ is equal to $$\rho = \sqrt{0.1} = 0.316 \quad (6)$$

resulting, for a mobile speed $v$ of 3 km/h and a carrier frequency $f_0$ of 2 GHz, in a LCR equal to $$LCR = f_0 \cdot \frac{v}{c} \cdot \rho \cdot \sqrt{2\pi} \cdot e^{-\rho^2} = 3.9 \text{ fades/s} \quad (7)$$

Figure 11:
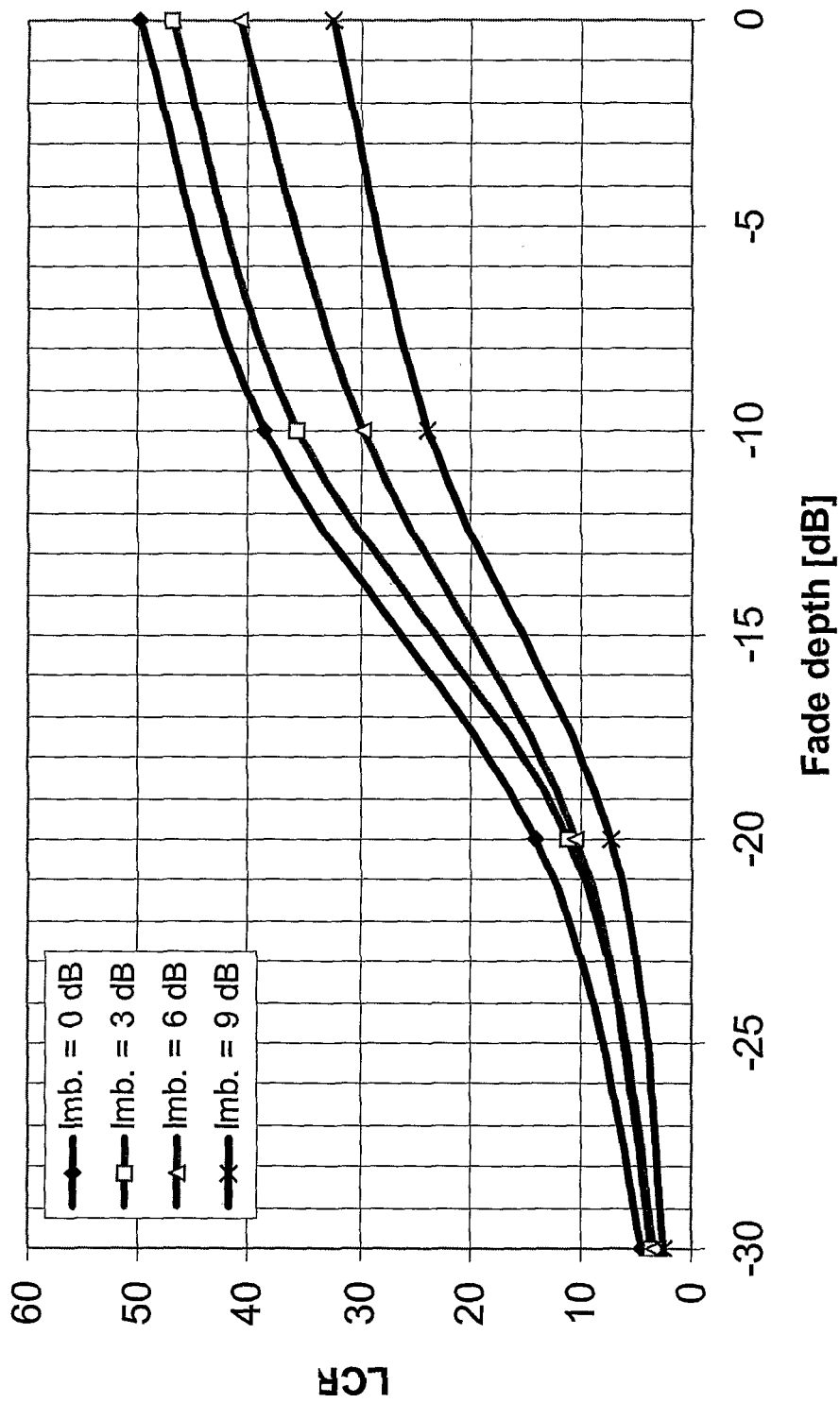

In a wireless system using the DDD TX processor of FIG. 5 or FIG. 6 the LCR can be evaluated by simulation as shown in FIG. 11, where the LCR (ordinate scale) is given as a function of the fade depth parameter $10 \cdot \log_{10}(\rho^2)$—abscissa scale, referred to the received power in decibel. The results indicate that the LCR reduces as the power imbalance increases (0 dB, 3 dB, 6 dB, 9 dB). A lower LCR corresponds to a lower amplitude depth of the induced fades and that reduces the probability that a block of uncoded bits is received with errors. With an accurate choice of the power imbalance is then possible to avoid the BLER degradation for the uncoded transmission modes.

The application of the DDD processor in systems that use multiple transmission modes with different coding rates requires an accurate optimisation of the DDD parameters. The experimental measurements have shown that optimum link performance can be obtained with a period of the DDD of the same order of the interleaving period used in the communication system. This choice maximizes the effectiveness of channel coding and therefore the link performance gain for the transmission modes that use channel coding (indicatively with rates $r \leq \frac{1}{2}$). The power imbalance $\Delta$ is instead optimised by considering the uncoded transmission modes or the transmission modes with the highest coding rates.

Figure 12:
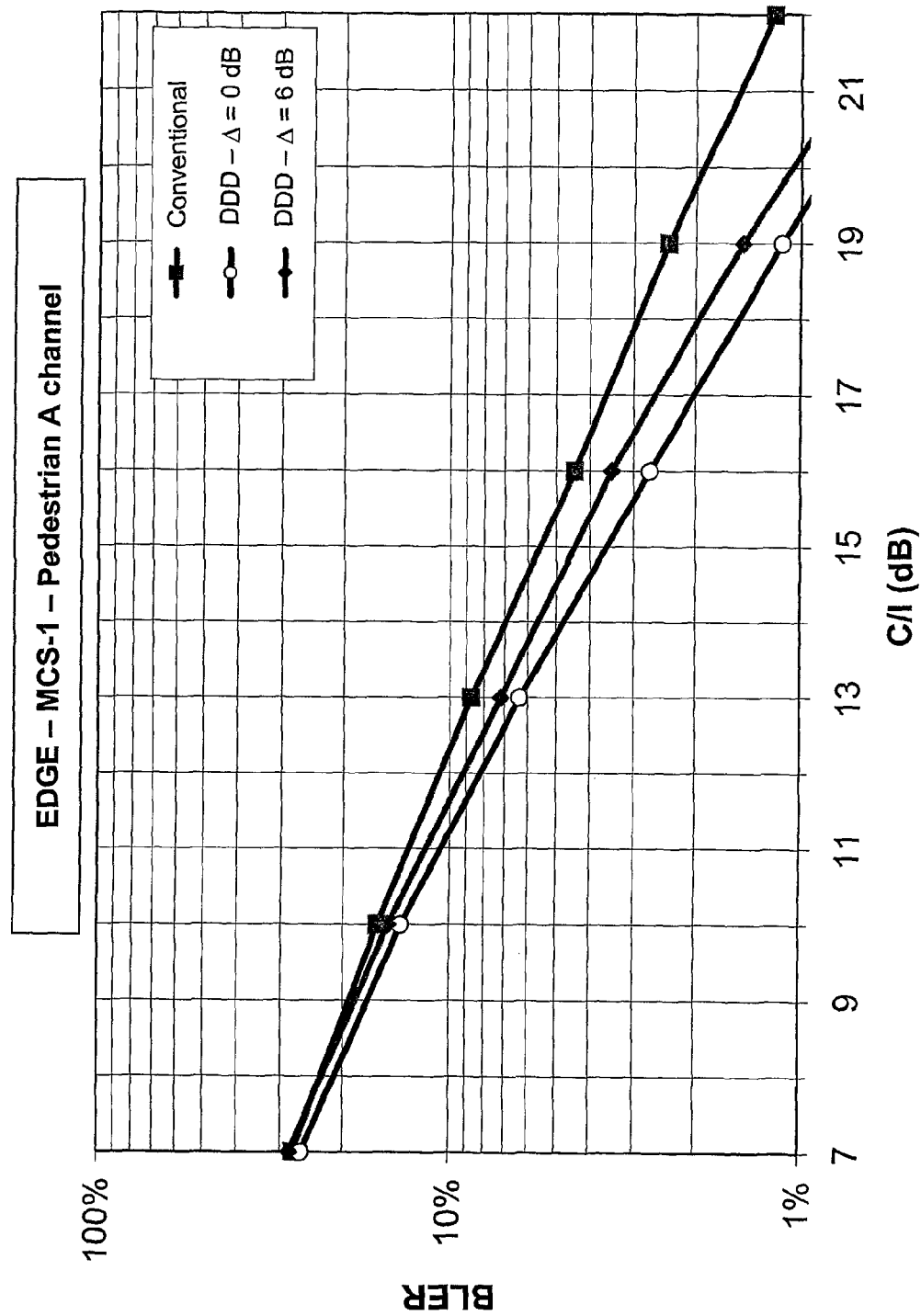
Figure 13:
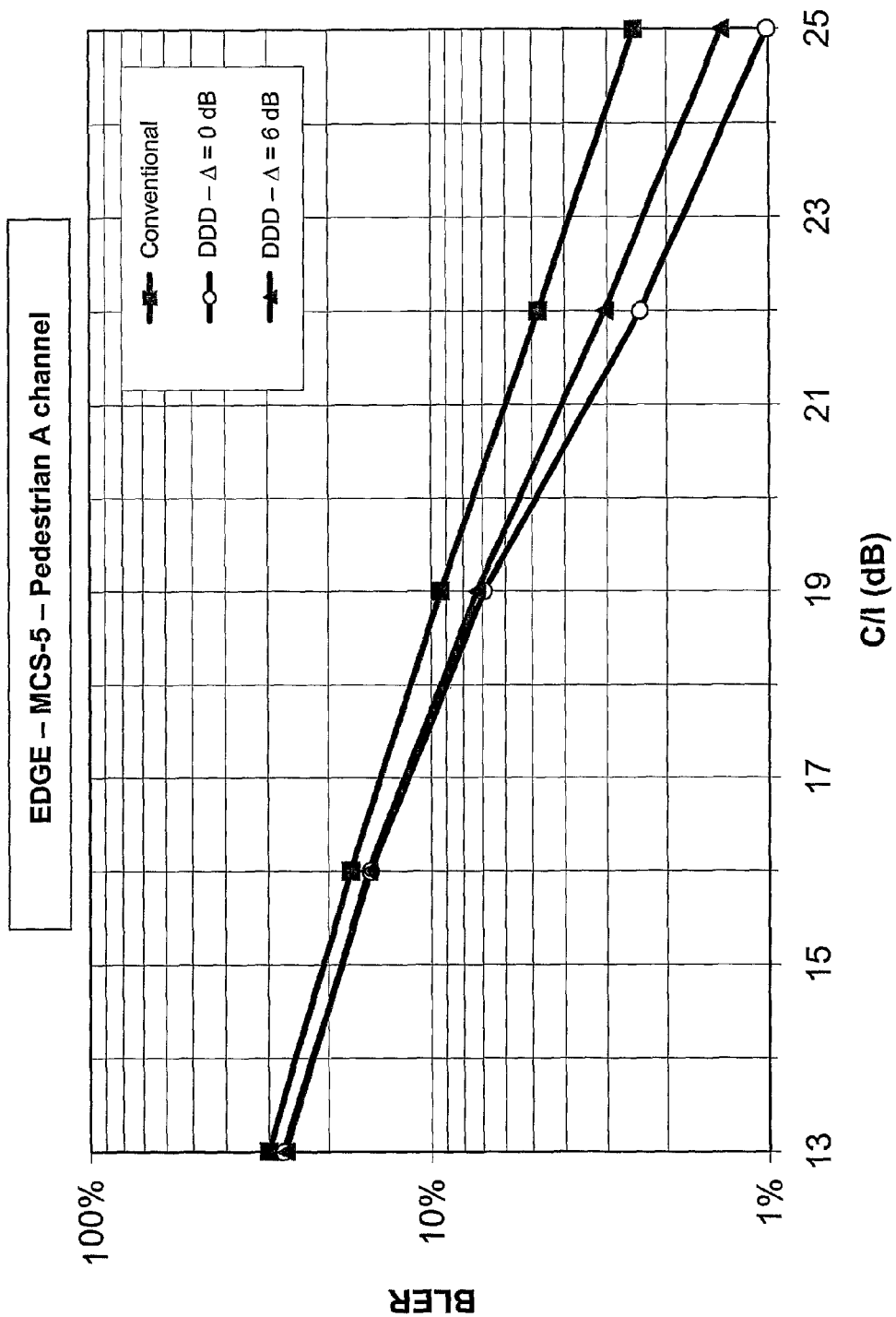
Figure 14:
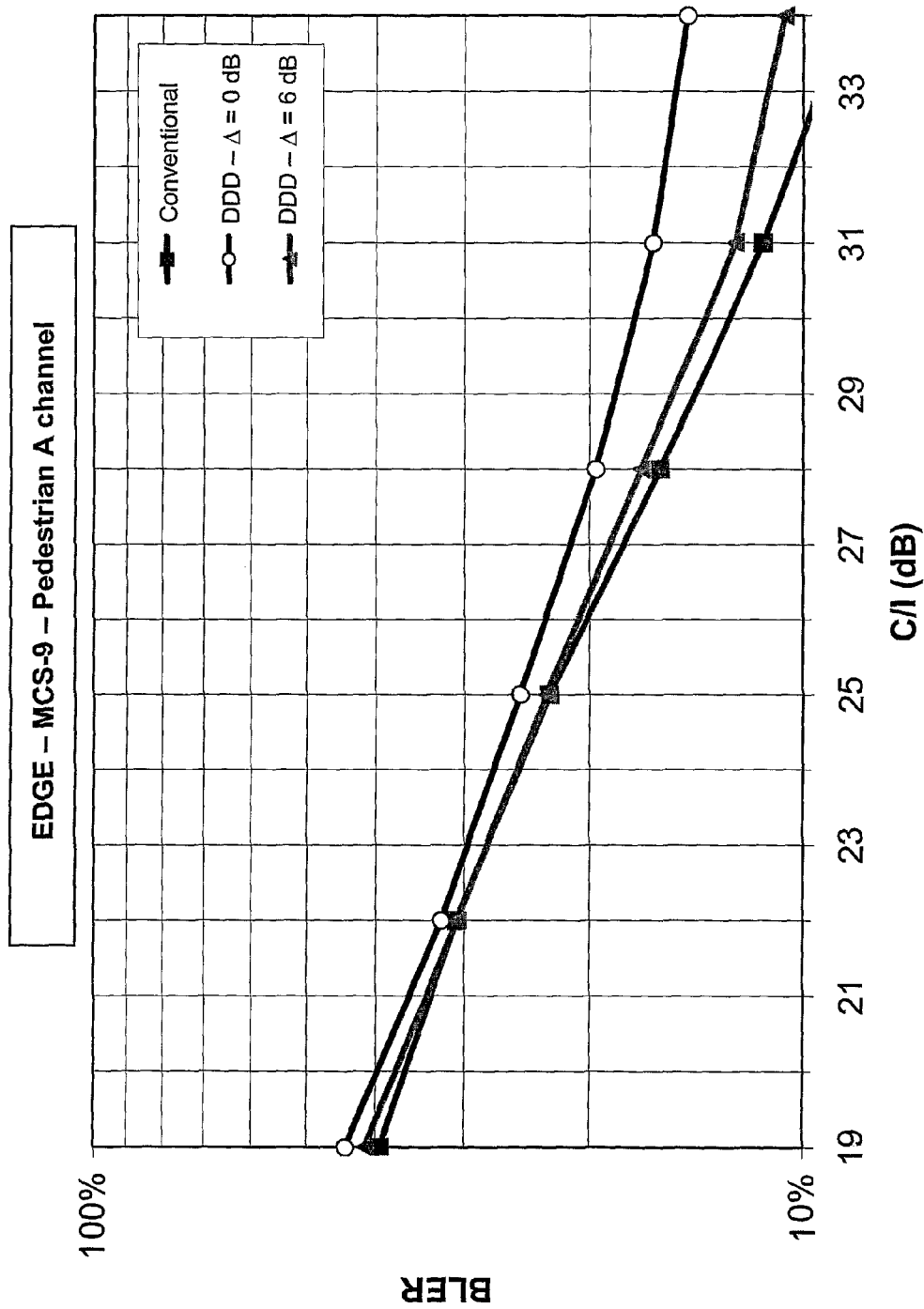

The diagrams of FIGS. 12, 13 and 14 provide some experimental measurement results obtained with an EDGE test-bed and using the DDD TX processor of FIG. 5. In particular the figures show the effect of the power imbalance on the link performance. The link performance is given in terms of BLER (ordinate scale) after channel decoding as a function of C/I (Signal to Interference plus Noise Ratio—abscissa scale) for the MCS-1, MCS-5 and MCS-9 transmission mode, respectively. The period of the DDD is set equal to 36 ms as it provides a good performance gain for the coded transmission modes, which use in the physical layer a block interleaving of 20 ms.

From the Figures one notices that, with a power imbalance $\Delta = 6$ dB, the arrangement described herein:
provides an appreciable performance improvement for the transmission modes MCS-1 and MCS-5 that use channel coding, and
ensures essentially the same performance of a system without DDD for the unencoded mode MCS-9.

This is in contrast to a system without imbalance, where the use of DDD would result in at least a certain degree of performance impairment for unencoded modes (such as MCS-9) or near-to-unencoded modes, i.e. modes having a coding rate near to unity.

In particular a C/I gain of about 0.8 and 1 dB is measured for the MCS-1 and MCS-5 transmission modes at a target BLER of 10%, with respect to a system without DDD. Performance of the transmission mode MCS-9 with a power imbalance of 6 dB is the same of the conventional system without DDD, for a target BLER of 30%. The BLER targets of 10% and 30% considered are normally taken as reference working points in the deployment of the EDGE networks. The application of the DDD technique with power imbalance thus improves the overall spectral efficiency of the wireless communication system, even when multiple transmission modes with different coding rates are used.

In general, the degree of imbalance $\Delta$ will be increased as a function of the channel coding rate, which means that higher imbalance values (e.g. 6 dB) will be used for uncoded (e.g. MCS-9) or near-to-uncoded modes, so that the value of imbalance will approximately be proportional to the coding rate.

Stated otherwise, the level imbalance value $\Delta$ is selected as a function of the transmission mode by selecting increasing (i.e. higher) level imbalance values for increasing (i.e. higher) coding rates. In practice, the specific values for $\Delta$ can be property identified via numerical simulation or experimental testing.

Experiments carried out heretofore by the applicant show that power imbalance values of 3 to 10 dB ensure that no performance degradation is caused to the uncoded or near-to-uncoded transmission modes and thus the same BLER performance of a system without DDD is obtained. With this design choice, the application of the DDD technique improves the overall spectral efficiency of the wireless communication system even when multiple transmission modes are used. Clearly, different tradeoffs between the performance of the coded and unencoded transmission modes are possible with different choices of the DDD parameters.

The following description relates to FIGS. 15 to 27. These figures illustrate a number of possible developments of the basic DDD processing schemes described in connection with FIGS. 5 and 6. While a corresponding description is not re-iterated for the sake of brevity, it will be appreciated that all the possible variants now described lend themselves to be implemented with selectively varying splitting/combination coefficients $\alpha_1$ and $\alpha_2$. Again, these coefficients may be possibly varied via a line/input C as shown in FIGS. 5 and 6. This may either be in the form of a "una tantum" trimming of the system or in the form of automatic adjustment under the control of a block 19 sensitive to the current transmission mode used (e.g. any of the modes MCS-1 to MCS-9 or 1 to 22 contemplated in FIGS. 1 and 2).

A preferred common feature to the various embodiments described herein lies in that, as the at least two signal replicas considered have respectively higher and lower power levels (i.e. the power level of the first replica is higher than the power level of the second replica, so that the power level of the second replica is lower than the power level of the first replica), the DDD arrangement described herein provides for the time variable delay being preferably applied to the replica having a lower power level. As indicated this is advantageous as it facilitates the use of low power handling components for the delay element(s).

It will be further appreciated that while—for the sake of simplicity—only arrangements including two diversity antennas 1, 2 are described herein and shown in the FIGS. 3a, 3b, 5, 6, and 15 to 29, the invention is adapted to be applied to arrangements including any of a plural number of diversity antennas, namely three diversity antennas or more.

As a first example of an alternative embodiment, the DDD technique can be also used at the receiver side to improve the radio link performance of wireless systems even if not designed to support the receiver diversity.

In this case (see e.g. FIGS. 15 and 16) a conventional receiver 22 is equipped with a single radio chain and thus only one RF signal can be demodulated. The DDD RX processor 20 is an add-on RF module connected between the receiving antennas 1,2 and the conventional receiver 22.

Figure 15:
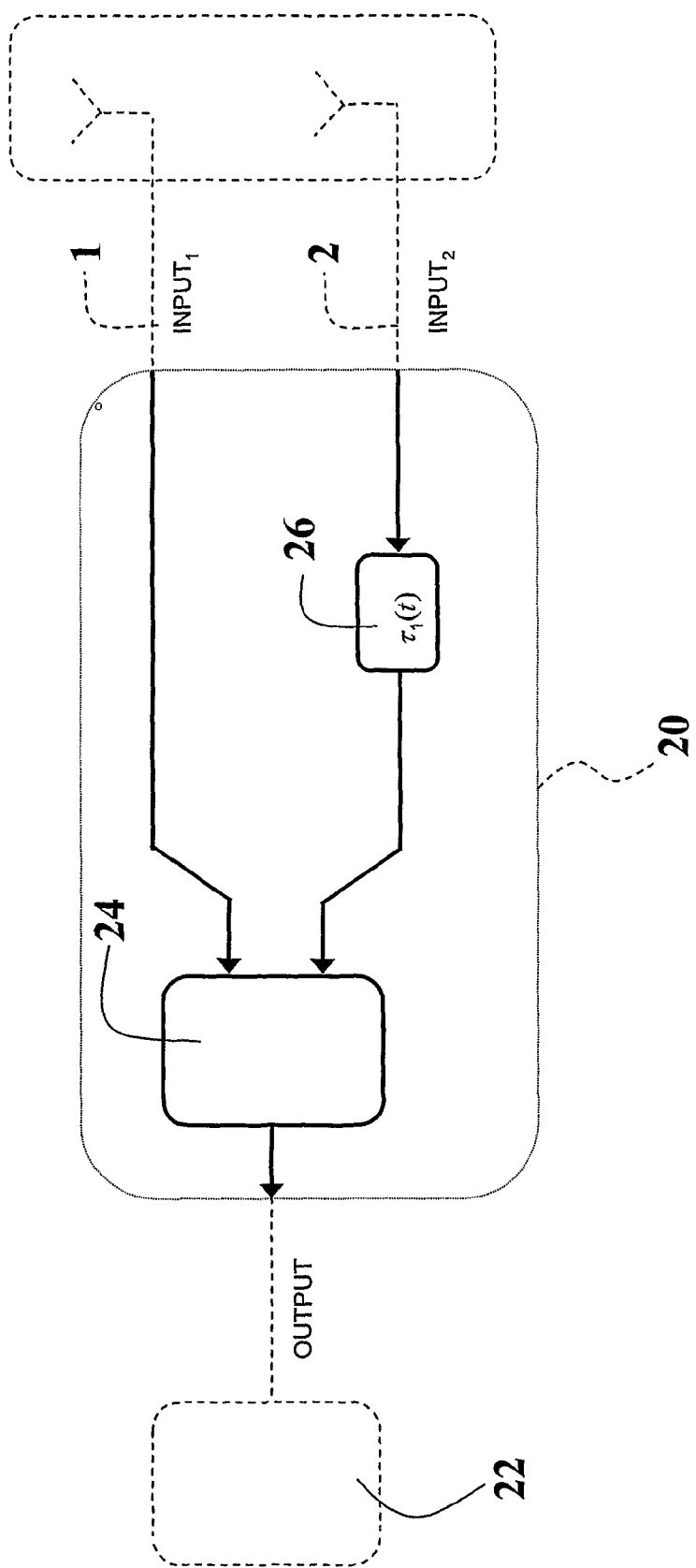
FIGS. 15 and 16 are schematic block diagrams of possible embodiments of a diversity arrangement as described herein when applied on the receiver side.

Specifically, the scheme of a DDD RX processor 20 suitable for conventional receivers that do not support antenna diversity is shown in FIG. 15. The processor 20 includes an asymmetric combiner 24 and a time variant delay line 26. The asymmetric combiner 24 combines (i.e. adds) the two RF signals so that the power ratio of the two combined signals is equal to $$\Delta = 10 \cdot \log_{10}\left(\frac{P_1}{P_2}\right) \text{ [dB]} \quad (8)$$

where $P_1$ and $P_2$ are the powers of the first and second received signals before the combination. In the scheme of FIG. 15, the signal received from the first antenna 1 is provided to the first input of the asymmetric combiner 24 while a second antenna 2 is added and this received signal is subject to the time variant delay 26 and then provided to the second input of the combiner. The combined signal is then provided to the conventional receiver 22 for the subsequent demodulation.

By denoting with $r_1(t)$ and $r_2(t)$ the signals received at the two antennas 1 and 2, the signal $z(t)$ at the output of the DDD processor can be expressed as follows $$z(t) = \alpha_1 \cdot r_1(t) + \alpha_2 \cdot r_2(t - \Sigma_1(t)) \quad (9)$$

where $\alpha_1$ and $\alpha_2$ are the combining coefficients introduced by the asymmetric combiner. If we suppose that the two received signals $r_1(t)$ and $r_2(t)$ have the same average power, the imbalance can then be expressed as follows $$\Delta = 10 \cdot \log_{10}\left(\frac{\alpha_1}{\alpha_2}\right)^2 \quad (10)$$

Figure 16:
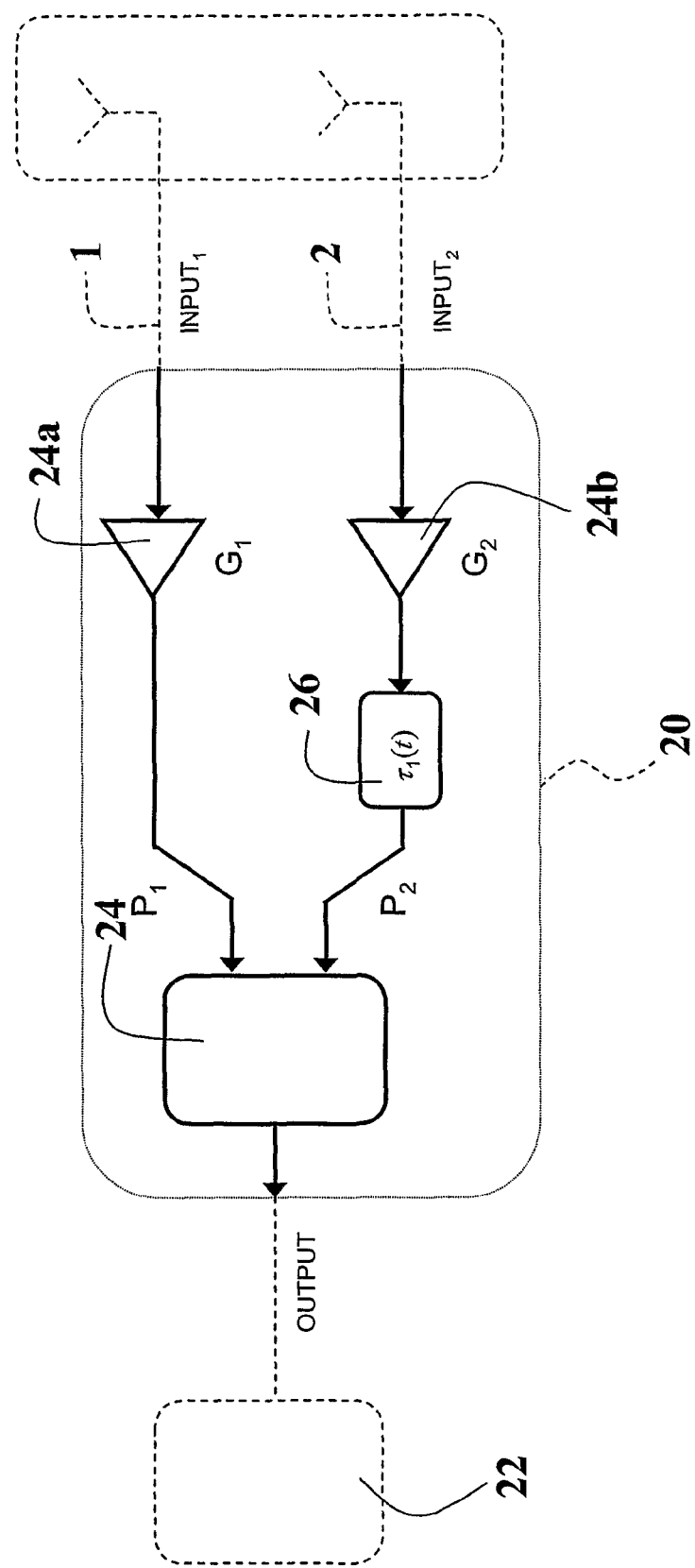

The DDD RX processor 20 can also be realized according to the second architecture shown in FIG. 16. The signals received from the antennas 1, 2 are amplified by two Low Noise Amplifiers (LNAs) 24a and 24b with different gains $G_1$ and $G_2$. The signal received from the first antenna 1 is provided to a symmetric RF combiner 24 while the signal from the second antenna 2 is subject to the time variant delay. After the insertion of the delay 26, the second signal is then provided to the other input of the symmetric combiner. The symmetric combiner adds the two input signals maintaining the power imbalance A of the signals at its inputs. The gains $G_1$ and $G_2$ of the LNAs 24a and 24b are set in order to obtain the desired power imbalance between the received signals prior to the RF combination.

The effect of the power imbalance, in the case of the DDD technique is applied at the receiver side, is similar to that described in connection with FIG. 9 with reference to transmission of a single frequency component. Again, the signals received at the antennas may be represented as two phasors, whose amplitude and phase change according to the channel characteristic. In low mobility environments these variations can be very slow thus causing prolonged signal fades. The insertion of the time variant delay on one of the received signals and the subsequent combination cause the alternation of constructive and destructive combining, which reduces the length of the error bursts and thus improves the effectiveness of the transmission modes that use channel coding. However, the alternation of constructive and destructive combining may negatively affect the Block Error Rate of the uncoded transmission modes. By introducing the power imbalance it is possible to reduce the depth of the fades induced by the DDD and thus avoid any performance degradation of the uncoded transmission modes.

The DDD processors can be also applied to improve the performance of conventional transmitters and receivers that support some kind of transmission or receive antenna diversity.

Figure 17:
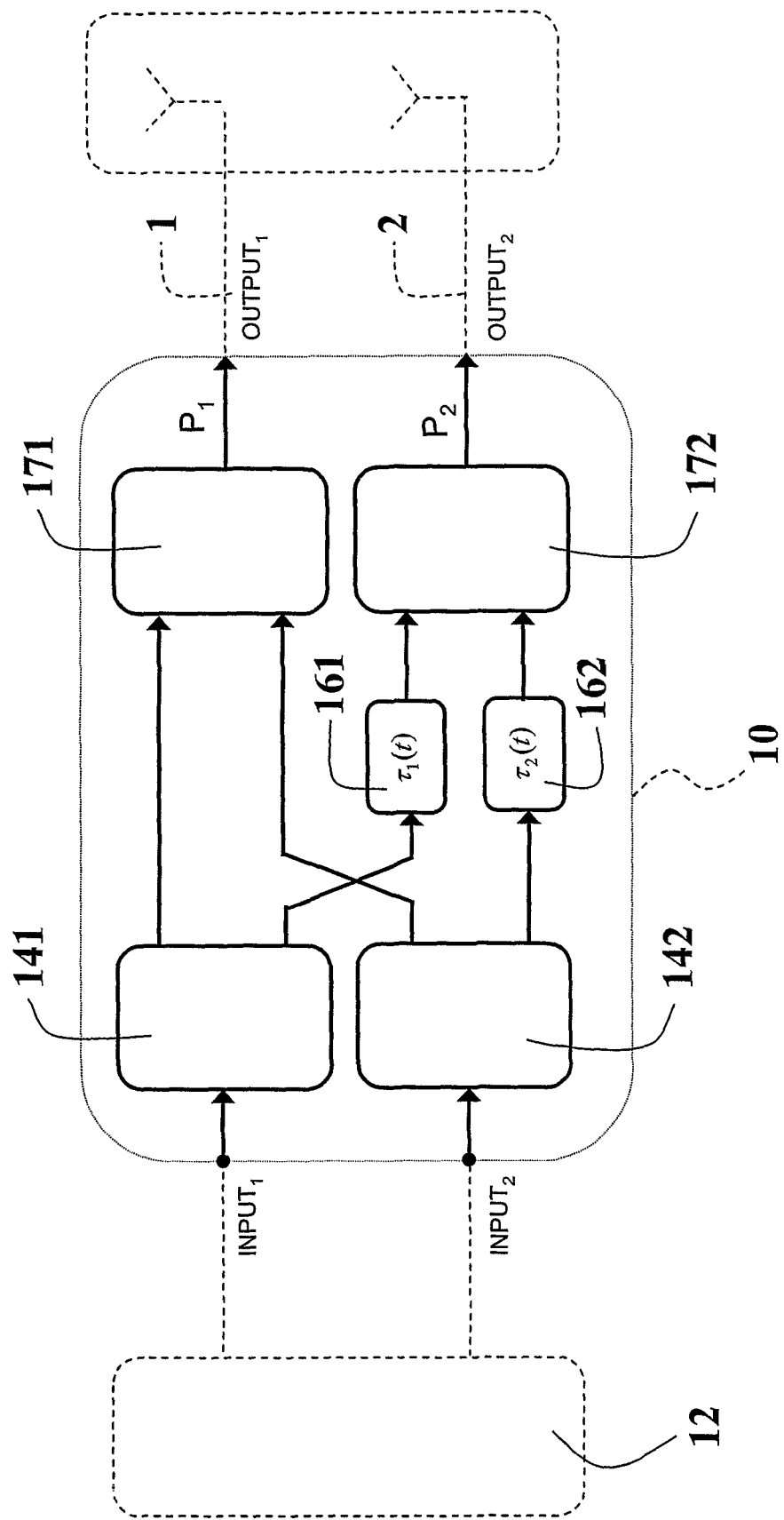
FIGS. 17 to 27 are block diagrams that illustrate various system architectures involving diversity arrangements as described herein.

A block diagram of such a DDD TX processor is shown in FIG. 17. The signals $\text{INPUT}_1$, $\text{INPUT}_2$ at the outputs of the conventional transmitter 12 feed two asymmetric splitters 141, 142. Each splitter divides the input signal in two replicas with different powers. Two of the four signals obtained after RF splitting are directly recombined in a first (symmetric) combiner 171, while the other two signals are subject to time variant delays in two delay elements 161 and 162 and then recombined in a second (symmetric) combiner 172. The signals after recombination feed the transmitting antennas 1, 2.

The power asymmetry of the splitters is designed in order to obtain the desired imbalance $\Delta$ (see equation 1) between the powers $P_1$ and $P_2$ radiated by the two antennas 1, 2. By denoting with $x_1(t)$ and $x_2(t)$ the signals at the output of the conventional transmitter, the two transmitted signals $y_1(t)$ and $y_2(t)$ can be expressed as follows $$y_1(t) = \alpha_1 \cdot x_1(t) + \alpha_3 \cdot x_2(t)$$

$$y_2(t) = \alpha_2 \cdot x_1(t - \tau_1(t)) + \alpha_4 \cdot x_2(t - \tau_2(t)) \quad (11)$$

where $\alpha_1$ and $\alpha_2$ are the amplitude coefficients introduced by the first asymmetric splitter, while $\alpha_3$ and $\alpha_4$ are the amplitude coefficients introduced by the second asymmetric splitter. In the typical configuration of the DDD TX processor, the two asymmetric splitter are identical so that we may assume $\alpha_1 = \alpha_3$ and $\alpha_2 = \alpha_4$.

As demonstrated in detail in PCT/EP2005/010799, the arrangement illustrated in FIG. 17 corresponds to a specific, simplified implementation of a more general layout where time variable delay lines are associated to all of the four signal propagation paths that connect the inputs $INPUT_1$ and $INPUT_2$ to the antennas 1 and 2 via the splitters 141, 142 and the combiners 171, 172.

With a proper choice of the delay functions (e.g. the two delay functions $\tau_1(t)$ and $\tau_2(t)$ of FIG. 17) the DDD TX processor 10 works as a signal decorrelator by providing two output signals that have a lower cross-correlation coefficient than the cross-correlation coefficient of the two input signals $INPUT_1$ and $INPUT_2$. In particular, in the embodiment illustrated in FIG. 17, the DDD TX processor 10 operates as a signal decorrelator by using two delay functions $\tau_1(t)$ and $\tau_2(t)$ that satisfy the following condition $$\tau_2(t) = \tau_1(t) + \frac{T_0}{2} \quad (12)$$

where $T_0$ is the carrier period of the (RF or IF) input signals $INPUT_1$ and $INPUT_2$.

Figure 18:
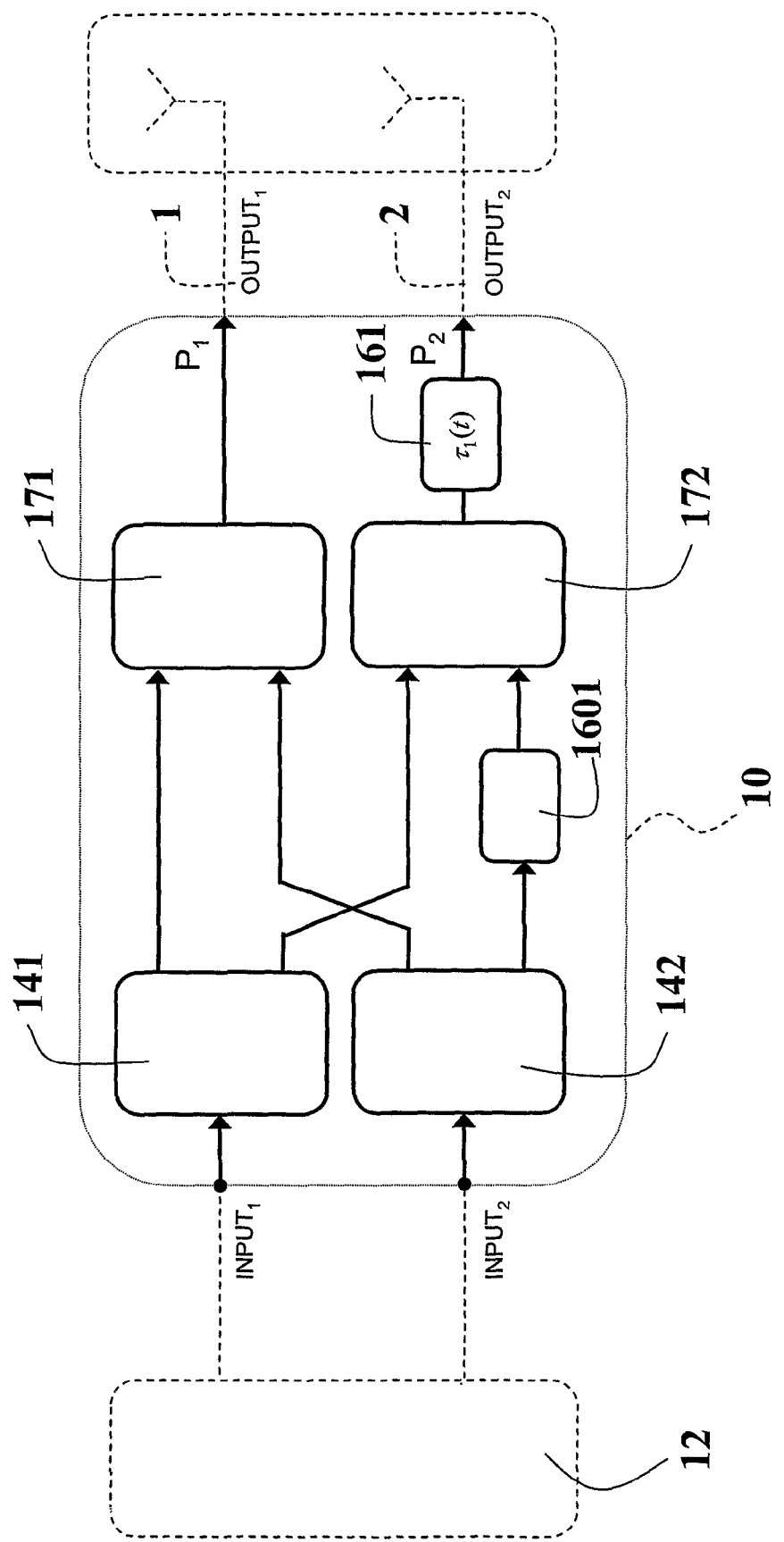

By taking into account the formula (12) the structure of the DDD TX processor of FIG. 17 can be simplified as illustrated in FIG. 18. There, the two time variant delay lines 161, 162 of FIG. 17 are replaced by:
- a single variable delay element (delay line) 161 inserted after the combiner 172, i.e. on a common portion of the propagation paths of the signals $INPUT_1$ and $INPUT_2$ towards the antenna 2; and
- a fixed delay element 1601 with a delay equal to $T_0/2$ inserted between the splitter 142 and the combiner 172, i.e. on those portions of the propagation paths of the signals $INPUT_1$ and $INPUT_2$ towards the antenna 2 that are distinct from each other.

Along the same lines of the arrangements of FIGS. 6 and 16, the asymmetric/imbalanced arrangements of DDD TX processors of FIGS. 17 and 18 can be also implemented by using symmetric splitters 141, 142 and cascading to the combiners 171, 172 two power amplifiers with different gains $G_1$ and $G_2$.

Figure 19:
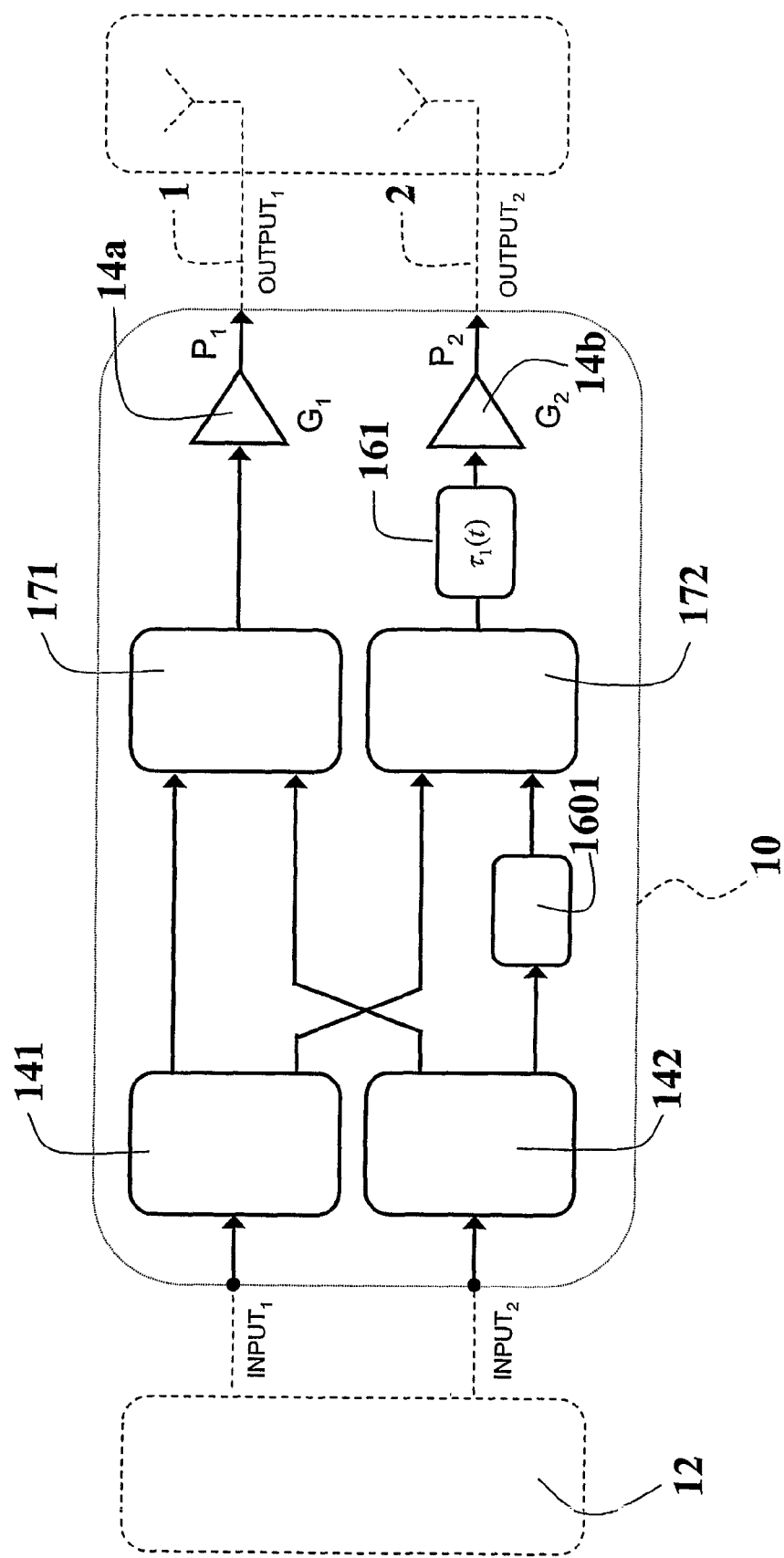

FIG. 19 shows two such power amplifiers 14a, 14b with different gains $G_1$ and $G_2$ inserted prior to the antennas 1, 2 within the processor layout illustrated in FIG. 18 (the extension to the processor layout of FIG. 17 is straightforward and is not illustrated in detail).

The gains of the power amplifiers 14a, 14b are determined in order to obtain the desired transmission power imbalance Δ. This architecture has the advantage that the DDD processor can be realized with low power components. The application of this architecture is suitable for communication networks that use Remote Radio Head (RRH) units.

The same DDD processor concept can be also employed at the receiver side in order to improve the performance of conventional receivers that support antenna diversity. The DDD RX processor is inserted between the antenna subsystem and the two RF inputs of a conventional receiver 22.

Figure 20:
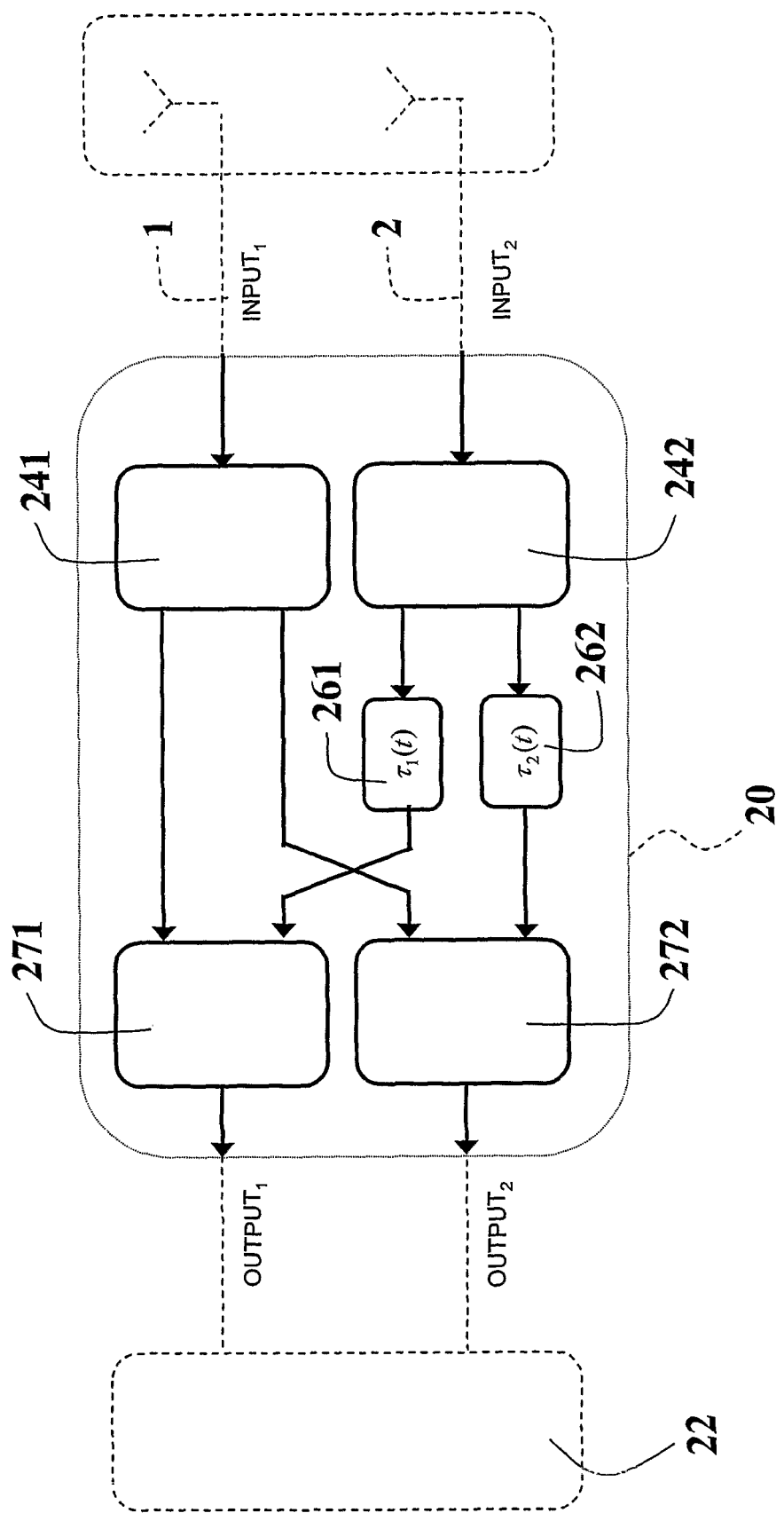

A first architecture of such a DDD RX processor 20 is shown in FIG. 20. The received signals at the antennas are provided to two splitters 241, 242. Each splitter divides the input signal in two replicas with the same power. Two of the four signals obtained after RF splitting are directly recombined by means of an asymmetric combiner 271. The other two signals are subject to time variant delays 261, 262 and then asymmetrically recombined in a combiner 272. The signals after recombination then feed the conventional receiver.

The asymmetry of the combiners 271, 272 is designed in order to obtain the desired imbalance A between the powers of the recombined signals.

By denoting with $r_1(t)$ and $r_2(t)$ the signals received at the two antennas, the signals $z_1(t)$ and $z_2(t)$ at the output of the DDD processor can be expressed as follows $$z_1(t) = \alpha_1 \cdot r_1(t) + \alpha_2 \cdot r_2(t-\tau_1(t))$$

$$z_2(t) = \alpha_3 \cdot r_1(t) + \alpha_4 \cdot r_2(t-\tau_2(t)) \quad (13)$$

where $\alpha_1$ and $\alpha_2$ are the combining coefficients introduced by the first asymmetric combiner and $\alpha_3$ and $\alpha_4$ are the combining coefficients introduced by the second asymmetric combiner. By assuming that the two signals received $r_1(t)$ and $r_2(t)$ have the same average power, the power imbalance for the first output signal $z_1(t)$ can be expressed as follows $$\Delta_1 = 10 \cdot \log_{10}\left(\frac{\alpha_1}{\alpha_2}\right)^2 \quad (14)$$

while the power imbalance for the second output signal $z_2(t)$ is equal to $$\Delta_2 = 10 \cdot \log_{10}\left(\frac{\alpha_3}{\alpha_4}\right)^2 \quad (15)$$

In the typical configuration of the DDD RX processor, the power imbalance on the two branches are set equal (namely $\Delta_1 = \Delta_2$), which can be obtained by setting $\alpha_1 = \alpha_3$ and $\alpha_2 = \alpha_4$ or using two identical asymmetric combiners.

Again as demonstrated in detail in PCT/EP2005/010799, the arrangement illustrated in FIG. 20 corresponds to a specific, simplified implementation of a more general layout where time variable delay lines are associated to all of the four signal propagation paths that connect the antennas 1 and 2 to the outputs $OUTPUT_1$ and $OUTPUT_2$ via the splitters 241, 242 and the combiners 271, 272.

With a proper choice of the delay functions (e.g. the two delay functions $\tau_1(t)$ and $\tau_2(t)$ of FIG. 20) the DDD RX processor operates as a signal decorrelator by providing two output signals that have a lower cross-correlation coefficient than the cross-correlation coefficient of the two input signals.

Figure 21:
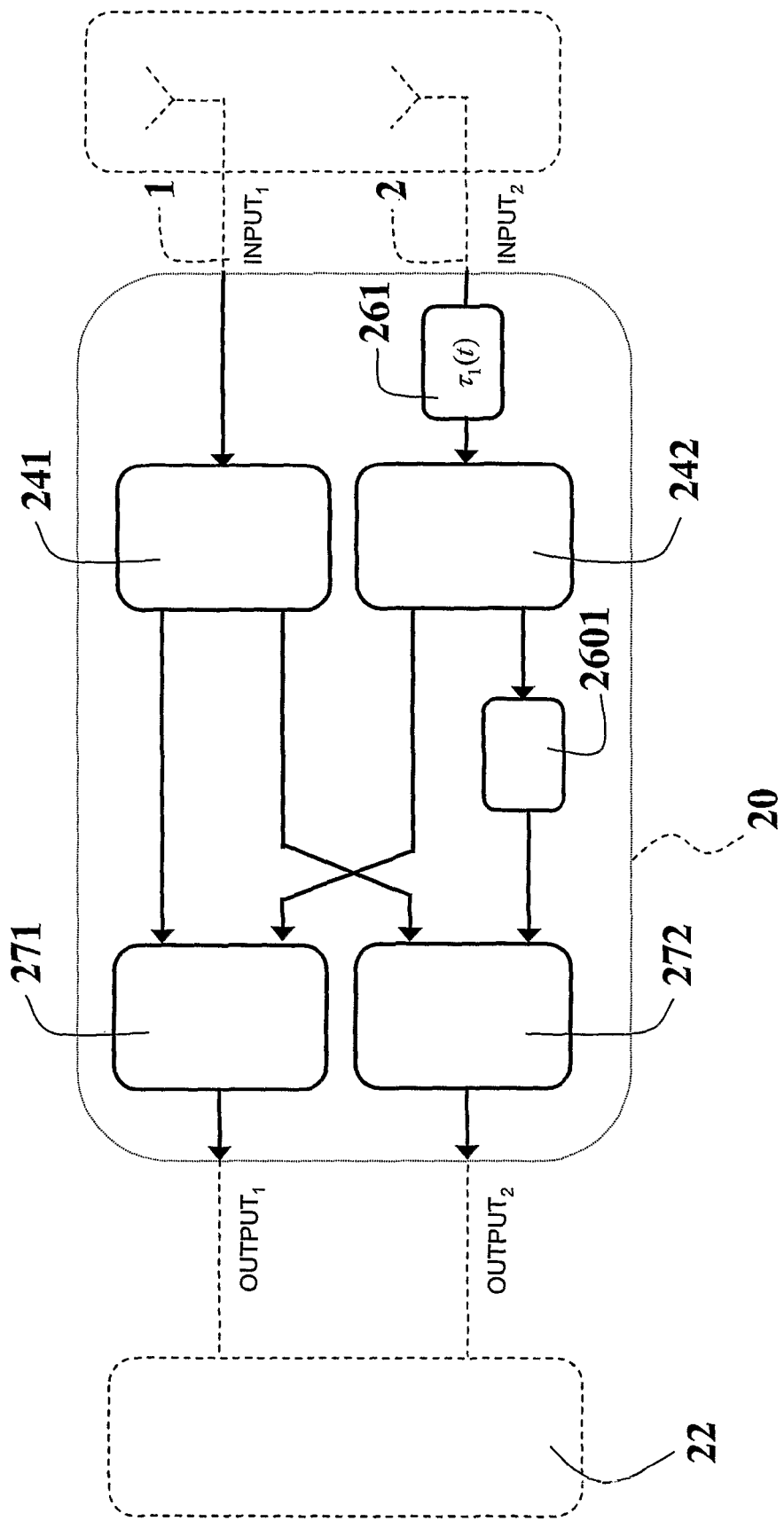

By taking into account the formula (12), which—mutatis mutandis—also applies to DDD RX processing, the processor of FIG. 20 can be simplified as illustrated in FIG. 21. There, the two time variant delay lines 261, 262 of FIG. 20 are replaced by:
- a single variable delay element (delay line) 261 inserted before the splitter 242, i.e. on the common portion of the signal propagation paths from the antenna 2 towards the outputs $OUTPUT_1$ and $OUTPUT_2$; and
- a fixed delay element 2601 with a delay equal to $T_0/2$ (where $T_0$ is the carrier period) inserted between the splitter 242 and the combiner 272, i.e. on those portions of the signal propagation paths from the antenna 2 to the outputs $OUTPUT_1$ and $OUTPUT_2$ that are distinct from each other.

Along the same lines of the arrangements of FIGS. 6, 16, and 19 the asymmetric/imbalanced arrangements of DDD RX processors of FIGS. 20 and 21 can be also implemented by using symmetric combiners 271, 272 and placing upstream of the splitters 241, 242 two low noise amplifiers (LNAs) with different gains $G_1$ and $G_2$.

Figure 22:
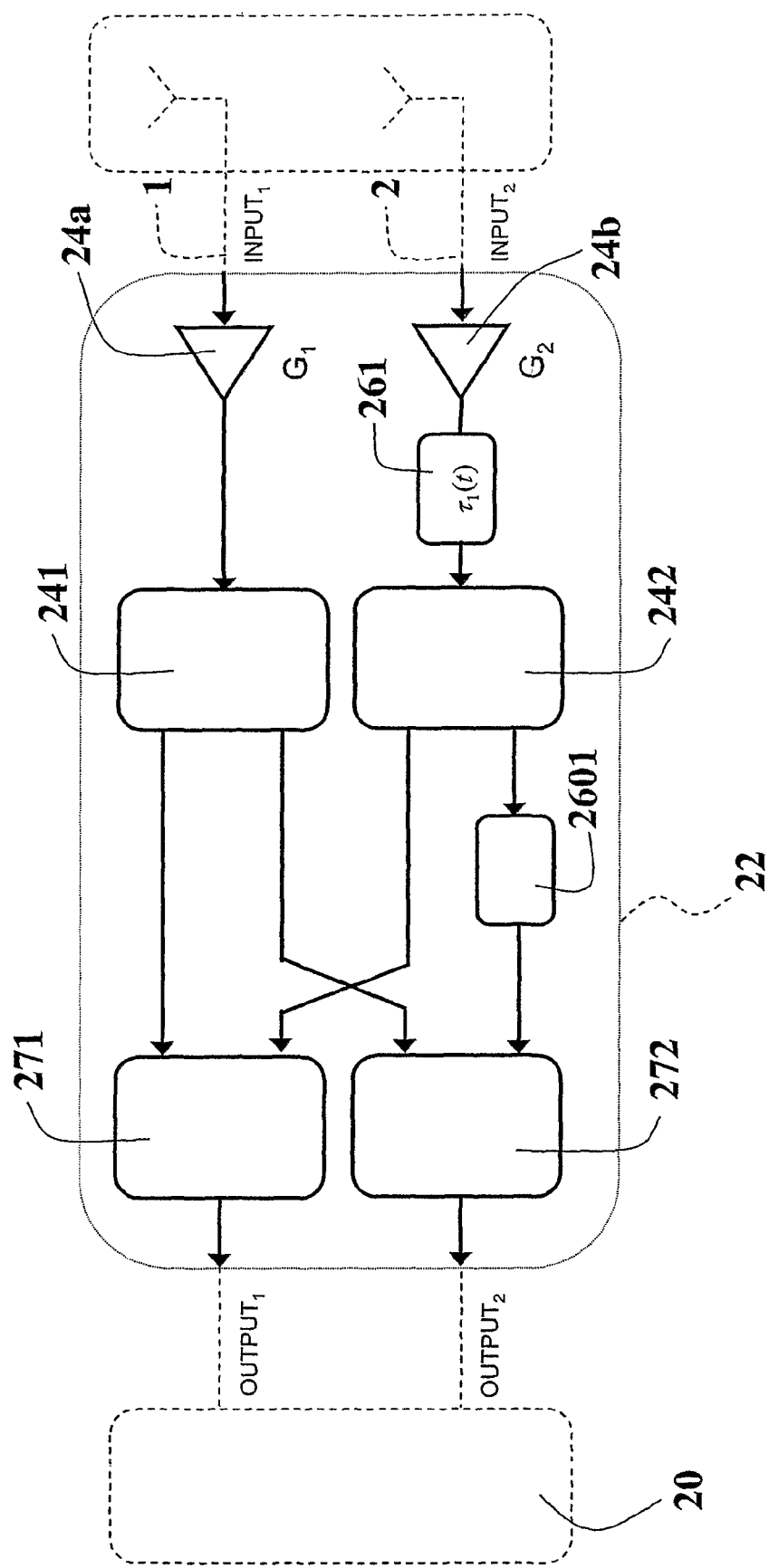

FIG. 22 shows the arrangement resulting from the use of two such amplifiers 24a, 24b inserted at the outputs of the receiving antennas 1, 2. In this case two symmetric combiners 271, 272 are used, while the gains of the LNAs 24a, 24b are designed in order to obtain the desired imbalance between the powers of the recombined signals. The application of this architecture (which can be applied also to the receiver layout of FIG. 20) is suitable for communication networks that use Remote Radio Head (RRH) units.

The DDD processors described up to now are unidirectional devices that can be used separately for transmission (TX) or reception (RX). Comparison of e.g. the architectures of FIG. 5 (DDD TX processor) and FIG. 15 (DDD RX processor) shows that the two circuits are inherently symmetrical.

As a consequence, a single DDD TX/RX processor, implemented with reciprocal components, can be used simultaneously both for transmission and reception. The same consideration holds for the architectures shown in FIG. 18 and FIG. 21, used together with conventional transceivers that support transmit and receive diversity.

Figure 23:
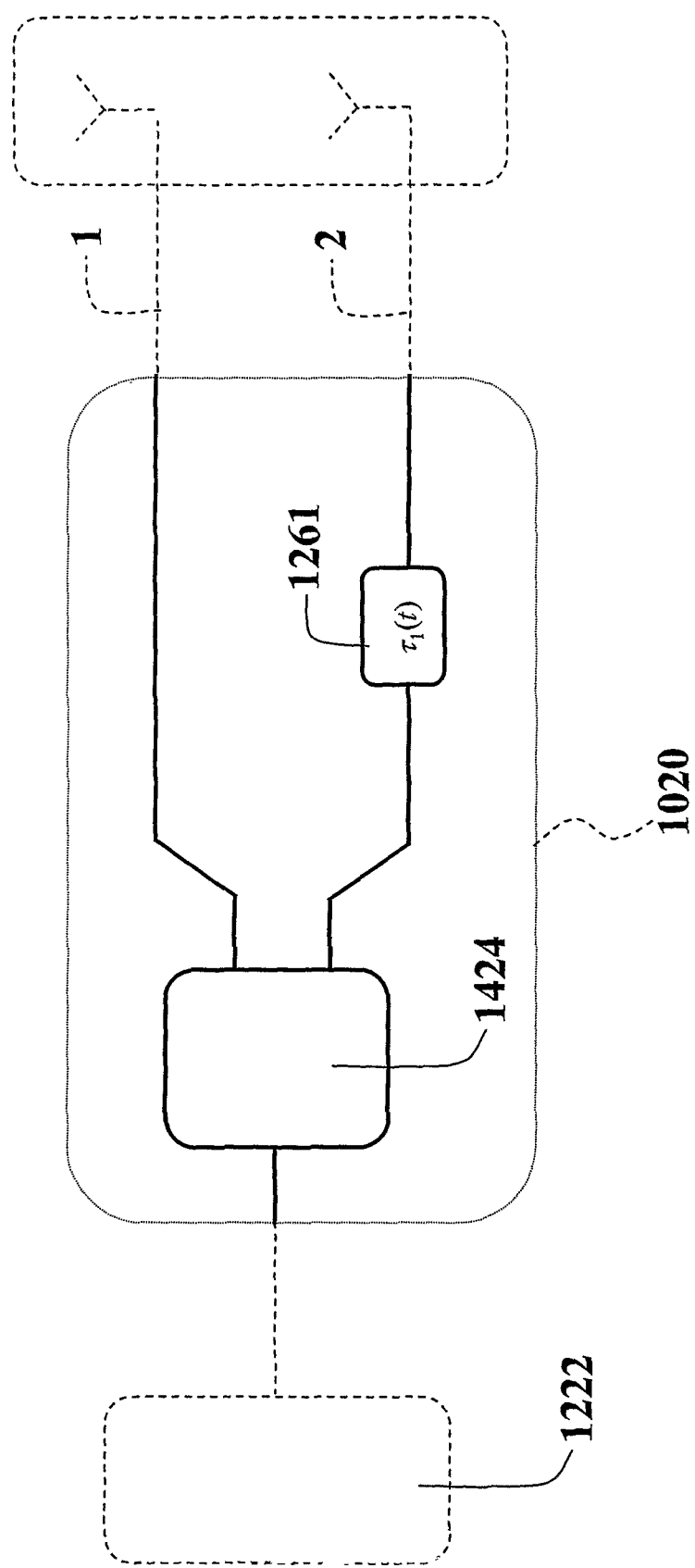
Figure 24:
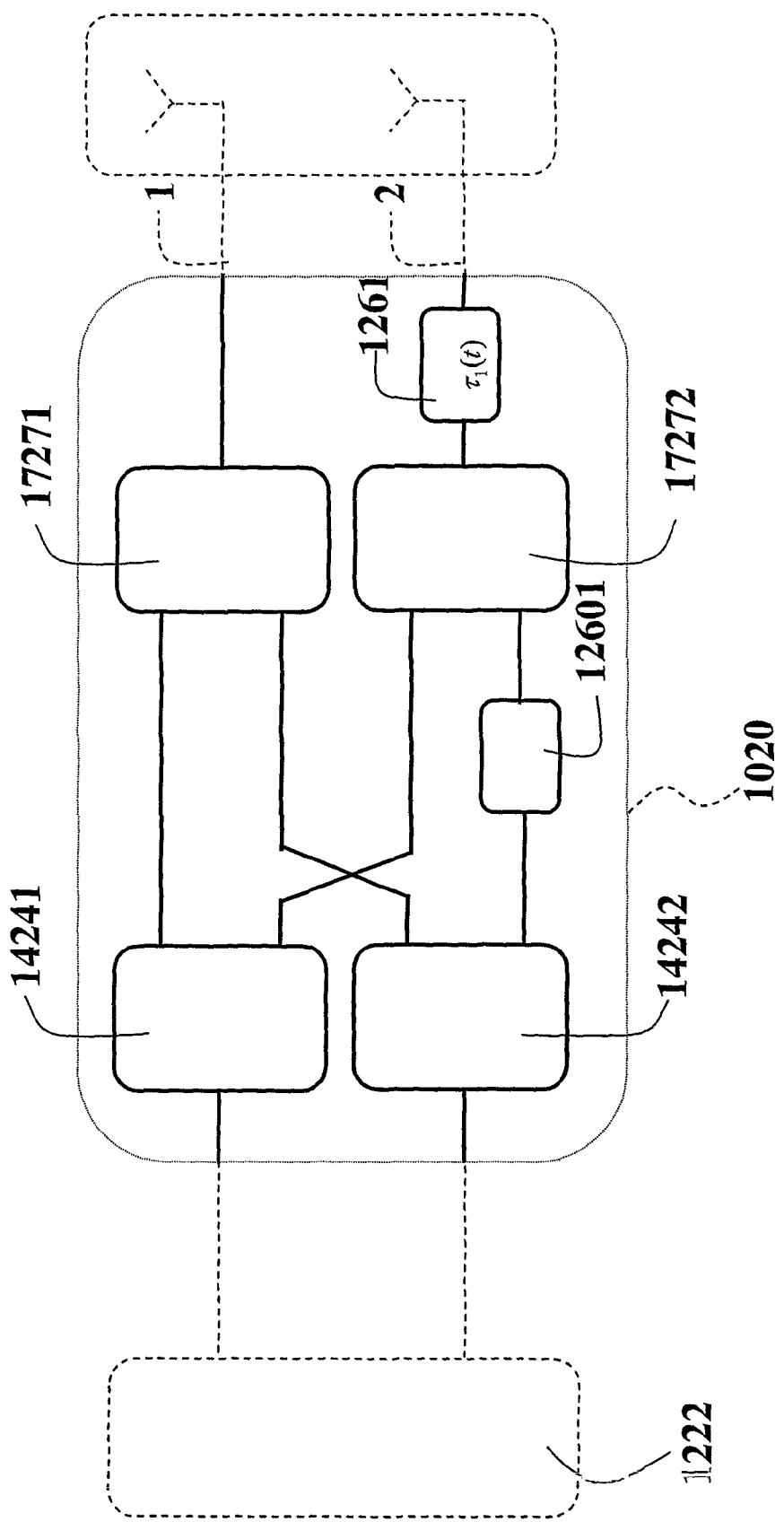

FIG. 23 and FIG. 24 show the architectures of DDD TX/RX processors 1020 realized with reciprocal components that can be used simultaneously for transmission and reception. The separation of transmit and receive paths is realized within the transceiver by means of duplexer elements.

The "transceiver" block 1222 in FIGS. 23 and 24 represents a unit that includes the functionalities of both the conventional transmitter and conventional receiver as shown in FIGS. 3a and 3b, respectively.

The block 1424 of FIG. 23 is a reciprocal module adapted to operate as an asymmetric splitter on the signal being transmitted from the TX section of the transceiver 1222 via the antennas 1, 2 and as an asymmetric combiner on the signals being received via the antennas 1, 2 and forwarded to the RX section of the transceiver 1222.

In the system of FIG. 24 two signals are both transmitted and received by means of the diversity antennas.

From the functional viewpoint, the system of FIG. 24 thus includes:
- two first splitters for splitting the two signals transmitted to produce two respective replicas transmitted over respective transmission paths towards different ones of the diversity antennas 1, 2,
- two second splitters for splitting the two signals received via the antennas 1, 2 to produce two respective replicas received over respective transmission paths from each diversity antenna 1, 2,
- two first combiners for combining the replicas received over respective transmission paths from different ones of the diversity antennas 1, 2, and
- two second combiners for combining at each diversity antenna 1, 2 respective replicas of each of the signals transmitted.

The system being "reciprocal" leads however the first splitters and the first combiners to be in fact comprised of a first pair of reciprocal elements 14241, 14242. Similarly, the second splitters and the second combiners are in fact comprised of a second pair of reciprocal elements 17271, 17272.

Those of skill in the art will promptly appreciate that the details of the various implementations of DDD processors previously described are not unique to the implementation in respect of which they have been described and can be applied also to other implementations. Similarly, various of these details lend themselves to be substituted by equivalent arrangements.

For instance, the arrangement illustrated in FIG. 24 can be alternatively implemented by using two (reciprocal) time variable delay elements playing the role of the transmission delay elements 161, 162 of FIG. 17 and the reception delay elements 261, 262 of FIG. 20.

As a further example, the location of the power and low-noise amplifiers described and shown in connection with several embodiments disclosed in the foregoing represents the presently preferred design choice, but is in no way mandatory; the skilled designer may in fact easily devise different equivalent arrangements for these power and low-noise amplifiers while preserving their function of producing the power imbalance/difference underlying operation of the invention.

Similarly, those of skill in the art will appreciate that the various implementations of DDD processors previously described can be combined in order to obtain different system architectures, where the DDD processing is introduced both in transmission and reception.

Figure 25:
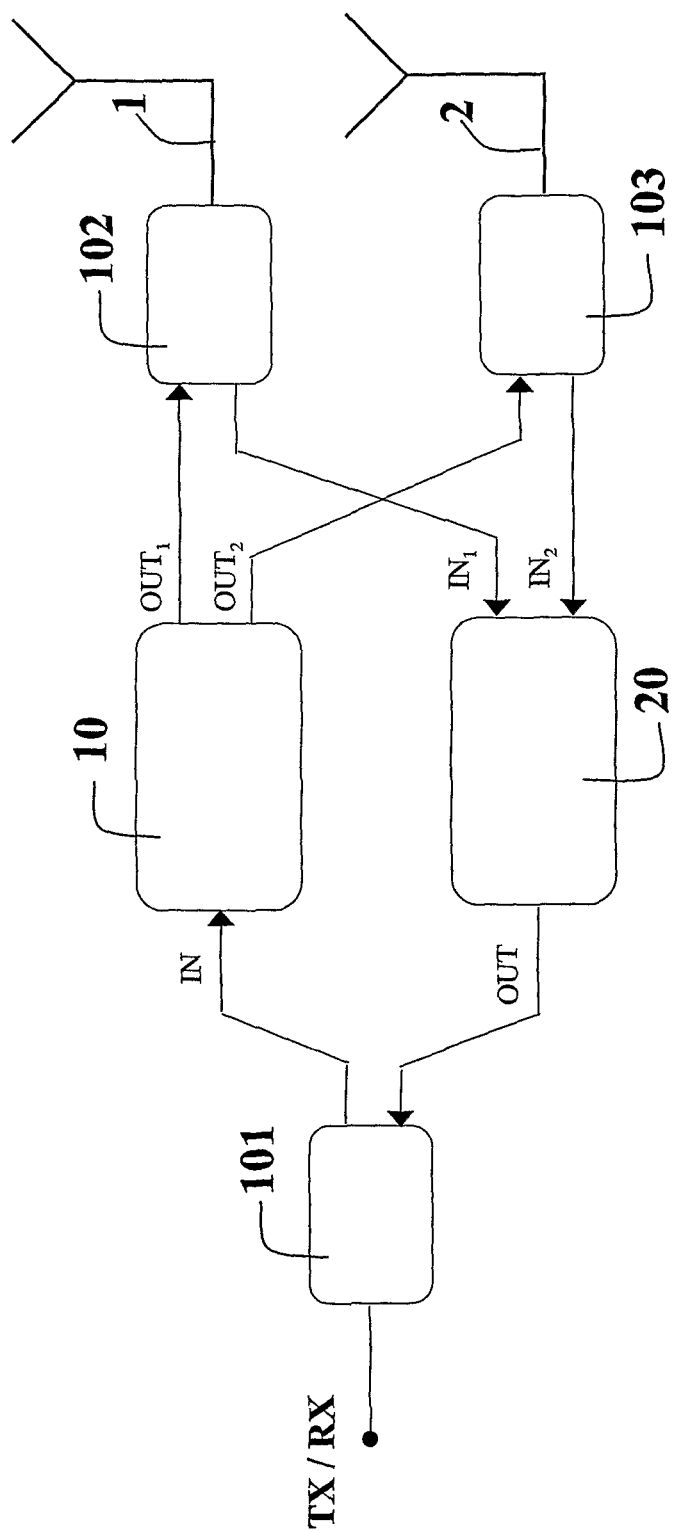

For instance, FIG. 25 shows a first system architecture based on non-reciprocal DDD transmit and receive processors 10, 20. This architecture is suitable for conventional transceivers that do not support any form of transmit and receive antenna diversity. The internal structures of the DDD TX and RX processors 10, 20 can be e.g. those disclosed in the FIGS. 5 and 6 or FIGS. 15 and 16 for the TX and RX parts, respectively. A first duplexer element 101 separates the transmission and reception paths on the TX/RX side, and the separation between transmit and receive paths at the antennas 1, 2 is obtained by means of two further duplexer elements 102, 103.

Figure 26:
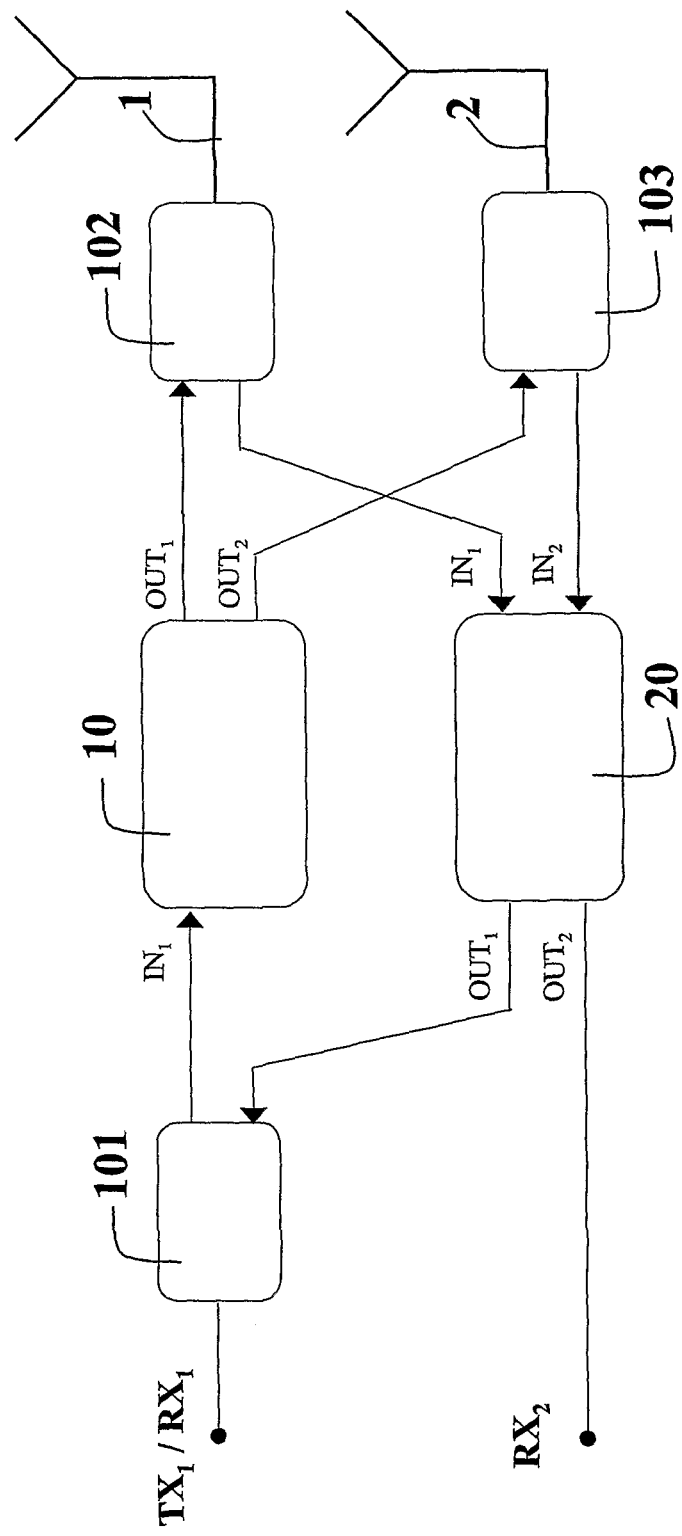

FIG. 26 illustrates another system architecture, realized with non-reciprocal processors, that is suitable for conventional transceivers that support only receive antenna diversity. The first duplexer element 101 here separates the transmission and reception paths $TX_1/RX_1$ at the port supporting the single transmission channel and one of the diversity reception channels, and the separation between transmit and receive paths at the antennas 1, 2 is again obtained by means of two further duplexer elements 102, 103. The DDD TX processor 10 can be implemented e.g. according to any of the structures shown in FIG. 5 or 6, while the DDD RX processor 20 can be implemented e.g. according to any of the schemes described in FIG. 20, 21 or 22.

Figure 27:
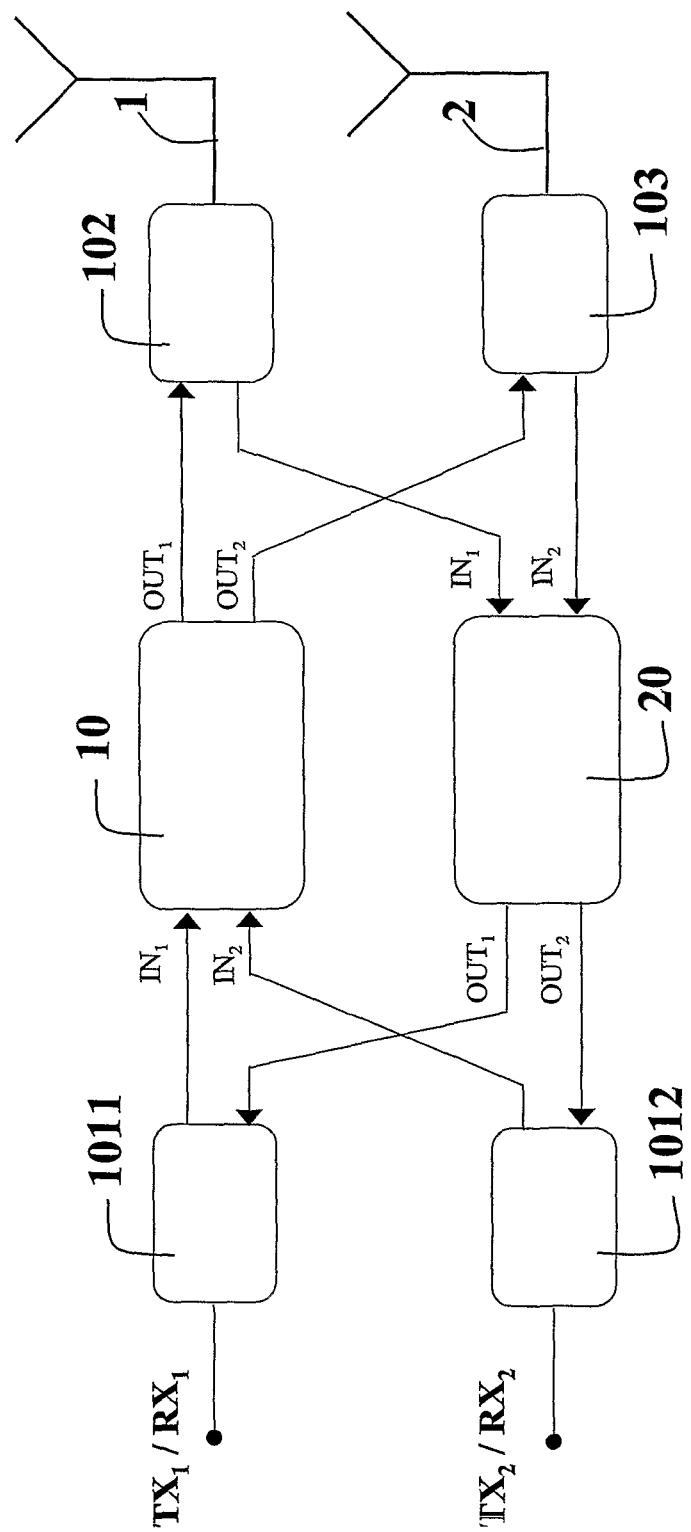

FIG. 27 illustrates still another system architecture, realized with non-reciprocal processors, which is suitable for conventional transceivers that support both transmit and receive antenna diversity. Two first duplexer elements 1011 and 1012 here separate the transmission and reception paths $TX_1/RX_1$ and $TX_2/RX_2$ at the two ports supporting the diversity transmission and reception channels. The separation between transmit and receive paths at the antennas 1, 2 is again obtained by means of two further duplexer elements 102, 103. The DDD TX processor 10 can be implemented e.g. according to any of the structures shown in FIG. 17, 18 or 19, while the DDD RX processor can be implemented e.g. according to any of the schemes described in FIG. 20, 21 or 22.

The exemplary embodiments of the invention presented in the foregoing refer to the transmission/reception of signals selected out of radiofrequency (RF) signals and intermediate frequency (IF) signals. Those of skill in the art will however appreciate that the invention can also be applied to baseband signals, in which case the effect of time variable delays may be obtained by subjecting the baseband signal(s) to multiplication by a complex signal.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method of diversity processing at least one signal propagated via at least two diversity antennas comprising the steps of:
    propagating at least two replicas of said at least one signal over respective propagation paths coupled to said at least two diversity antennas, whereby said replicas are propagated via different antennas;
    subjecting at least one of said replicas to a time variable delay;
    adjusting the power levels of said at least two replicas to produce a level imbalance therebetween;
    selectively using one of three or more transmission modes for said at least one signal; and
    selecting said level imbalance as a function of a selected transmission mode.

2. The method of claim 1, wherein said at least two replicas comprise replicas having respectively higher and lower power levels, and wherein the method comprises the step of subjecting to said time variable delay, said replica having a lower power level.

3. The method of claim 1, comprising the step of selecting said level imbalance in the range of 3 to 10 dB.

4. The method of claim 1, wherein said plurality of transmission modes have respective coding rates and comprises the step of selecting said level imbalance as a function of said coding rates, wherein higher level imbalance values are selected for higher coding rates.

5. The method of claim 1, comprising the steps of:
    selectively varying the transmission mode used; and
    adaptively varying said level imbalance as a function of the selected current transmission mode.

6. The method of claim 1, comprising the step of subjecting to time variable delays two of said replicas propagating over propagation paths associated with the same of said diversity antennas.

7. The method of claim 6, comprising the step of subjecting to time variable delays the replicas propagating over at least two of said propagation paths by:
    providing, in the propagation paths for said at least two replicas associated with the same of said diversity antennas, respective distinct propagation portions and a combined propagation portion for said at least two replicas;
    subjecting said at least two replicas to a time variable delay over the common portion of said propagation paths; and
    subjecting one of said at least two replicas to a fixed delay over a respective distinct portion of said propagation paths.

8. The method of claim 1, applied to at least one signal transmitted in the form of at least two replicas propagated over respective propagation paths toward said at least two diversity antennas, comprising the step of splitting said at least one signal transmitted to produce said at least two replicas of said at least one signal propagated over respective propagation paths coupled to said at least two diversity antennas.

9. The method of claim 8, wherein said splitting is an asymmetric splitting producing said level imbalance between said replicas.

10. The method of claim 9, wherein said splitting is a symmetric splitting, and further comprising the step of applying different gains over said respective propagation paths coupled to said at least two diversity antennas to produce said level imbalance between said replicas.

11. The method of claim 1, applied to at least one signal received in the form of at least two replicas propagated over respective propagation paths from said at least two diversity antennas, comprising the step of combining said at least two replicas to produce said at least one signal received.

12. The method of claim 11, wherein said combining is an asymmetric combining producing said level imbalance between said replicas.

13. The method of claim 11, wherein said combining is a symmetric combining, and further comprising the steps of applying different gains to said respective propagation paths of said replicas from said at least two diversity antennas to produce said level imbalance between said replicas.

14. The method of claim 11, applied to at least two signals received in the form of at least two replicas propagated over respective propagation paths from said at least two diversity antennas, comprising the step of splitting at each of said diversity antennas the respective propagation paths of said at least two signals received.

15. A system for diversity processing at least one signal propagated via at least two diversity antennas by means of the method of claim 1, comprising:
    respective propagation paths for propagating at least two replicas of said at least one signal, said respective propagation paths being coupled to said at least two diversity antennas, whereby said replicas are propagated via different antennas;
    at least one time variable delay element for subjecting at least one of said replicas to a time variable delay; and
    level adjusting elements arranged on said respective propagation paths to produce a level imbalance between the power levels of said at least two replicas.

16. The system of claim 15, comprising respective propagation paths for at least two said replicas having respectively higher and lower power levels, said at least one time variable delay element being arranged on the propagation path of said replica having a lower power level.

17. The system of claim 15, wherein said at least one signal is received in the form of at least two replicas propagated over respective propagation paths from said at least two diversity antennas, comprising at least one combiner for combining said at least two replicas to produce said at least one signal received.

18. The system of claim 17, wherein said at least one combiner is an asymmetric combiner producing said level imbalance between said replicas.

19. The system of claim 17, wherein said at least one combiner is a symmetric combiner, and further comprising gain elements for applying different gains to said respective propagation paths of said replicas from said at least two diversity antennas of said replicas to produce said level imbalance between said replicas.

20. The system of claim 15, wherein said at least one signal transmitted and received by means of said at least two diversity antennas, comprises:
    at least one splitter for splitting said at least one signal transmitted to produce at least two replicas transmitted over respective transmission paths toward said diversity antennas; and at least one combiner for combining said at least two replicas propagated over respective propagation paths from said at least two diversity antennas to produce said at least one signal received, wherein said at least one splitter and combiner comprise at least one reciprocal element.

21. A wireless communication apparatus comprising the system of claim 15.

22. A non-transitory computer-readable medium containing a computer program product, loadable into the memory of at least one computer and comprising software code portions capable of performing the method of claim 1.

* * * * *

UNITED STATES PATENT AND TRADEMARK OFFICE
CERTIFICATE OF CORRECTION

| | | |
|---|---|---|
| PATENT NO. | : 8,437,712 B2 | Page 1 of 1 |
| APPLICATION NO. | : 12/084134 | |
| DATED | : May 7, 2013 | |
| INVENTOR(S) | : Melis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this
Tenth Day of February, 2015

Michelle K. Lee
*Deputy Director of the United States Patent and Trademark Office*